US007346000B1

(12) United States Patent
Srinivasan et al.

(10) Patent No.: US 7,346,000 B1
(45) Date of Patent: Mar. 18, 2008

(54) METHOD AND APPARATUS FOR THROTTLING SELECTED TRAFFIC FLOWS

(75) Inventors: Varadarajan Srinivasan, Los Altos Hills, CA (US); Sandeep Khanna, Los Altos, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 858 days.

(21) Appl. No.: 10/613,628

(22) Filed: Jul. 2, 2003

Related U.S. Application Data

(60) Provisional application No. 60/393,902, filed on Jul. 3, 2002.

(51) Int. Cl.
*G01R 31/08* (2006.01)
*G06F 11/00* (2006.01)
*G08C 15/00* (2006.01)
*H04J 1/16* (2006.01)
*H04L 1/00* (2006.01)
*H04L 12/26* (2006.01)

(52) U.S. Cl. .................................................. 370/235
(58) Field of Classification Search ........... 370/395.21, 370/395.4, 229, 230.1, 468, 252, 236, 235.1, 370/235
See application file for complete search history.

(56) References Cited

U.S. PATENT DOCUMENTS 5,875,173 A * 2/1999 Ohgane et al. ............. 370/230

OTHER PUBLICATIONS

Blake et al, "An Architecture for Differentiated Services", RFC 2475, Dec. 1998.*

Heinanen et al, "A Single Rate Three Color Marker", RFC 2697, Sep. 1999.*

Advanced Traffic Management for Multiservice ATM Networks, www.net.com, Pub. Dec. 15, 2000, 22 pgs.

Agere Ads Additional PaloadPlus Processor to Product Line, Agere Press Release, Nov. 29, 2000, 3 pgs.

Architecture and Design of Function Specific Wire-Speed Routers for Optical Internetworking, published by Entridia Corp., Dec. 6, 2000, 60 pgs.

ATLAS I: A General-Purpose, Single-Chip ATM Switch with Credit-Based Flow Control, IEEE Hot Interconnects IV Symposium Proceedings, Standford, CA, Pub. Aug. 15-17, 1996, 11 pgs.

CSIX-L1:Common Switch Interface Specification-L1, published by CSIX, Aug. 5, 2000, 72 pgs.

Efficient Fair Queuing Using Deficit Round Robin, M Shreedhar, George Varghese, Pub. Date Unknown, 12 pgs.

genFlow CAN-2500gF OC48c Multiprotocol Traffic Management Coprocessor, Acorn Networks, Pub. Date Unknown, 4 pgs.

genFlow OC-48c Multiprotocol Traffic Management Coprocessor, Acorn Networks, Pub. Date unknown, 4 pgs.

Hierarchical Packet Fair Queueing Algorithms, Jon C.R. Bennett, Hui Zhang, Pub. Date Unknown, 14 pgs.

iFlow Networking using Smart Memory Technology, Silicon Access Networks, Pub. Oct. 2000, 10 pgs.

Implementation of ATLASI: a Single-Chip ATM Switch with Backpressure, IEEE Hot Interconnects IV Symposium Proceedings, Standford, CA, Pub. Aug. 13-15, 1998, 12 pgs.

(Continued)

*Primary Examiner*—Seema S. Rao
*Assistant Examiner*—Jianye Wu
(74) *Attorney, Agent, or Firm*—William L. Paradice, III

(57) ABSTRACT

A traffic management processor that selectively throttles individual traffic flows or particular traffic types specified in a throttle control instruction, which may also cause the traffic management processor to throttle all network traffic.

20 Claims, 17 Drawing Sheets

OTHER PUBLICATIONS

Introduction to ATM Traffic Management, www.net.com, Pub. Dec. 15, 2000, 15 pgs.
Network Processing New Concepts Using Smart Money Technology, Silicon Access Networks, Publ. Oct. 2000, 7 pgs.
Orologic's Traffi-Shaping Chip Set Handles ATM, IP, TechWeb.com, Nov. 30, 2000, 2 pgs.
PaceMaker 2.4 (formerly QoSCore, Orologic Press Release, Nov. 30, 2000 1 page.
PaceMaker 2.4 OC-48 Traffic Management Engine, Vitesse Semiconductor Corp., Pub 2000, 2 pgs.
PayloadPlus Routing Switch Processor, Lucent Technologies, Apr. 2000, 6 pgs.
PMC-Sierra's ATM Chip Set Provides the Traffic Management and Switch Fabric Core for Ericsson's AXD 301 ATM Switch, PMC-Sierra, Publ. Dec. 12, 2000, 10 Pgs.
Scalable Harware Earliest-Deadline-First Scheduler for ATM Switching Networks, 18th IEEE Reeal-Time Systems Symposium, Pub. 1997, 9 pgs.
Simulation Sutdy of Statistical Delays in an ATM Switch Using EDF Scheduling, Dept. of Computer Science, North Carolina State University, Pub. Jun. 24, 1999, 25 pgs.
Smart Memory Technology in the MAN, Silicon Access Networks, Pub. Oct. 2000, 6 pgs.
Smart Memory Technology Target Markets, Silicon Access Networks, Pub. Oct. 2000, 5 pgs.
Start-time Queuing: A Scheduling Algorithm for Integrated Services Packet Switching Networks, Pawan Goyal, Harrick M. Vin and Haichen Cheng, Distributed Multimedia Computing Laboratory, Dept. Computer Sciences, University of Texas at Austin, Pub. 1996, 12.
Statistical Delay Bounds Oriented Packet Scheduling Algorithms in High Speed Networks, by Kai Zhu, North Carolina State University, Pub. 2000, 6 pgs.
Traffic Scheduling in Packet-Switched Networks: Analysis, Design and Implementation, university of California, Santa Cruz, Pub. Jun. 1996, 107 pgs.
Traffic Stream Processor MXT 4400, Conexant, Pub. Date Unknown, 5 pgs.
Vitesse Announces Industry's First OC-48c Traffic Management Engine, Vitesse Semiconductor Corp., Sep. 28, 2000, 2 pgs.
Vitesse Announces Industry's First OC-48c Traffic Management Engine, Orologic Press Release, Nov. 30, 2000 2 pgs.
WAN Fast Intelligent Router, Silicon Access Netowrks, Pub. Oct. 23, 2000 4 pgs.
WF2Q: Worst-case Fair Weighted Queueing, Jon C.R. Bennett, Hui Zhang, Pub. Date Unknown, 9 pgs.
What is a Network Processor?, Vitesse Semiconductor Corp., Pub. Date Unknown, 4 pgs.
Wire Speed Quality of Service Over Ethernet, Switchcore, Pub. May 8, 2000, 19 pgs.
ZettaCom Delivers In-Service System Scalability with Highly Integrated OC-192 Hybrid Switch Fabric, biz.yahoo.com, Pub Nov. 11, 2000, 2 pgs.
Zettacom: Hurry Up and Wait, www.lightreading.com, Pub Nov. 29, 2000, 2 pgs.

* cited by examiner

METHOD AND APPARATUS FOR THROTTLING SELECTED TRAFFIC FLOWS

CROSS-REFERENCE TO RELATED APPLICATION

This application claims the benefit under 35 USC § 119(e) of the now abandoned and commonly owned U.S. Provisional Patent Application No. 60/393,902 entitled "Scheduling Processor" filed on Jul. 3, 2002, and incorporated herein by reference.

FIELD OF INVENTION

This invention relates generally to network routing and specifically to network traffic management.

DESCRIPTION OF RELATED ART

Routers are devices that direct traffic in a network. Each router in the network has a routing table that includes routing information to enable incoming packets to be forwarded or routed to their destination in the network. Some routers forward packets based only on the destination address indicated in the packet. Other, more complex routers forward or route packets based on policies defined, for example, by a network administrator. The latter routing schemes are commonly referred to as policy-based routing.

Policy-based routing can enable packets to be forwarded or routed in a network based on any number of criteria, including the source of the packet, the destination of the packet, the cost of forwarding the packet through different routes or paths in the network, or the bandwidth available on different routes in the network. Policy-based routing can also be used to provide a certain Quality of Service (QOS) to differentiated traffic in the network. QOS is a set of parameters that allows for the allocation of different levels of network services to different traffic flows. For example, when traffic through a network switch such as a router exceeds its bandwidth capacity, QOS parameters may be used to shape and/or police network traffic to ensure certain minimum service guarantees and to alleviate network congestion.

Typically, QOS parameters for network traffic are defined by a service level agreement (SLA). An SLA is a formal contract entered into by a service provider and its customers. The service provider contracts to transport packets of data across the provider's network with certain assurances on the quality of the transport. The SLA specifies customer expectations of performance in terms of availability, packet delay, packet loss, priority, and bandwidth for specific types of traffic flow. The types of traffic flows for a network may include, for example, constant bit rate (CBR), a variable bit rate (VBR), an unspecified bit rate (UBR), and an available bit rate (ABR).

Each of these traffic types has different transmission protocol requirements. For example, CBR traffic requires that a connection be able to send a specific number of packets or bits per second, and must have a set end-to-end bandwidth. For example, CBR traffic is typically utilized for mission critical traffic such as audio and video data streams. VBR traffic typically utilizes the well-known leaky bucket algorithm. Although VBR traffic has somewhat more flexible timing requirements than CBR traffic, VBR traffic must meet timing requirements dictated by the leaky bucket algorithm. ABR traffic requires sending of packets in response to network feedback such as, for example, congestion control information. UBR traffic can be scheduled for transmission according to a weighted fair queuing (WFQ) algorithm, a first come, first served (FCFS) algorithm, or other well-known scheduling technique. For example, in WFQ scheduling, a packet's departure time may be calculated by the expression $TD=TA+SZ/BW$, where $TD$ is the packet's departure time, $TA$ is the packet's arrival time, $SZ$ is the size of the packet, and $BW$ is a bandwidth parameter specified for the packet.

It is often desirable to throttle the bandwidth allocated to network traffic by a router, for example, to alleviate congestion. For example, a router can throttle bandwidth by adjusting the bandwidth parameter when calculating packet departure times to delay or push out the departure times. Typically, prior packet scheduling techniques aggregate similar types of traffic (e.g., into separate queuing mechanisms) and then collectively throttle similar traffic types. Although effective in alleviating network congestion, applying a throttling function to an aggregation of similar types of traffic does not allow for traffic flow differentiation. Thus, it would be desirable to selectively throttle individual traffic flows, for example, according to priority.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Figure 1:
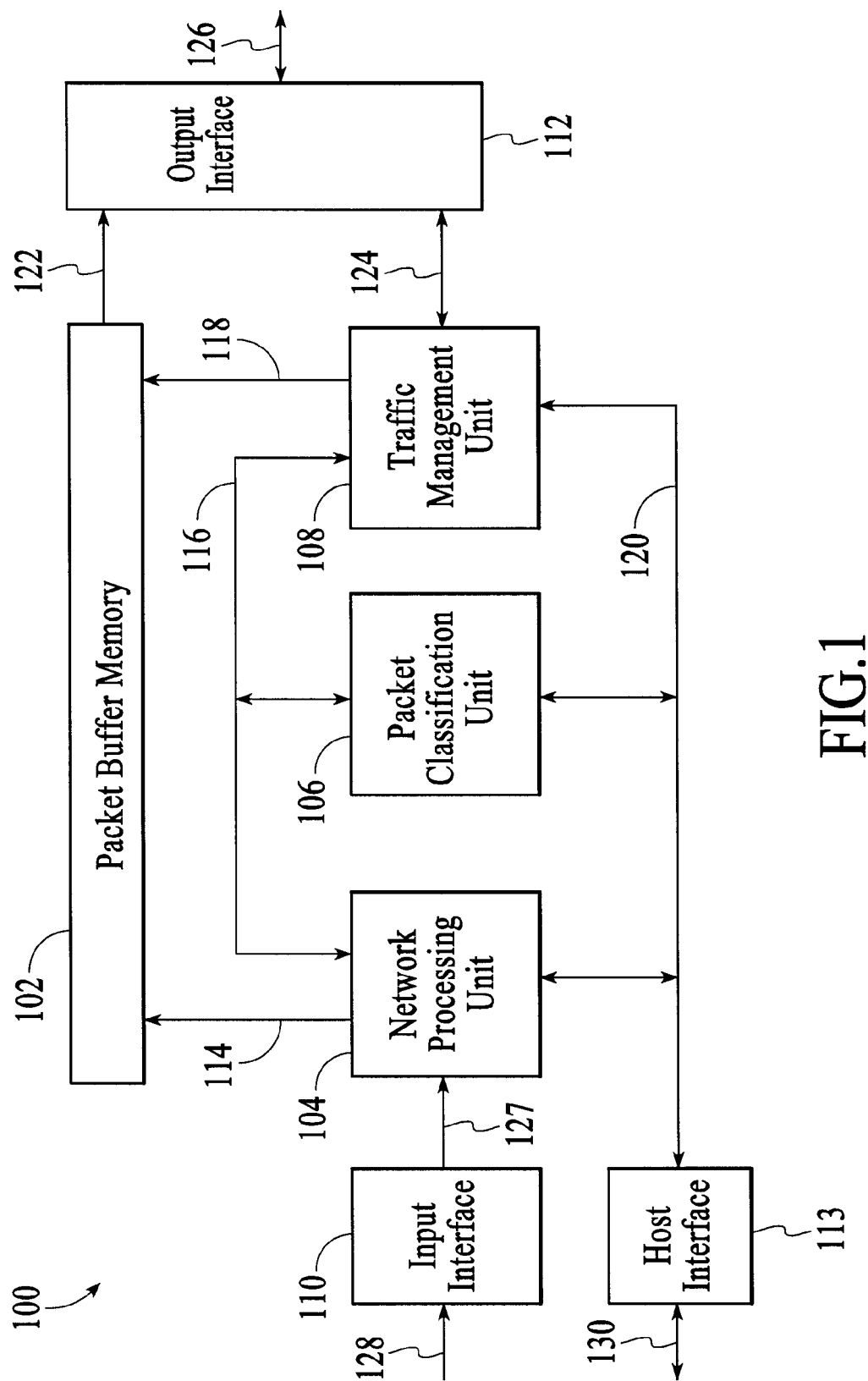
FIG. 1 is a block diagram of a system within which embodiments of the present invention may be implemented.

Traffic management processors in accordance with the present invention are discussed below in the context of a network routing system 100 for simplicity only. It is to be understood that present embodiments are applicable to any suitable network system, configuration, and/or architecture. Thus, for example, the configuration of system 100 as illustrated in FIG. 1 is exemplary. The interconnection between circuit elements or circuit blocks may be shown or described as multi-conductor or single-conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. Accordingly, the present invention is not to be construed as limited to specific examples described herein but rather includes within its scope all embodiments defined by the appended claims.

FIG. 1 shows a network routing system 100 in which embodiments of the present invention may be implemented. System 100 is shown to include a packet buffer memory 102, a network processing unit 104, a packet classification unit 106, a traffic management unit 108, an input interface 110, an output interface 112, and a host interface 113. Input interface 110 forwards packets received from bus 128 to network processing unit 104 via bus 127. Network processing unit 104 is well-known, and parses the packet into its header and payload. The packet payload is provided to packet buffer memory 102 via bus 114. Packet buffer memory 102 may be any well-known addressable memory element, and may include any number of storage locations of suitable length. For one embodiment, packet buffer memory 102 includes 32 k individually addressable rows for storing up to 32 k packet payloads. The packets are stored in packet buffer memory 102 until selected for departure (e.g., transmission) by traffic management unit 108. The packet header, which may include routing information, various QOS policies, SLA parameters, and other control information, as is generally known in the art, is provided to packet classification unit 106 and to traffic management unit 108 via bus 116.

Packet classification unit 106 implements one or more policies through the use of policy statements that define how to forward the packet in the associated network. Packet header information provided by network processing unit 104 is compared with these policy statements and, in response thereto, packet classification unit 106 provides routing information, QOS parameters, and other packet information to traffic management unit 108 via bus 116. For some embodiments packet classification unit 106 includes a content addressable memory (CAM) device to store the policy statements, and includes an associated RAM to store routing information, QOS policies, and/or SLA parameters. The CAM and associated RAM, which are not shown in FIG. 1 for simplicity, may be conventional, and may be internal or external to packet classification unit 106.

For one embodiment, packet classification unit 106 is of the type disclosed in co-pending and commonly-owned U.S. patent application Ser. No. 09/406,170 entitled "METHOD AND APPARATUS FOR PERFORMING PACKET CLASSIFICATION FOR POLICY BASED PACKET ROUTING," issued Nov. 28, 2006 as U.S. Pat. No. 7,143,231, which is incorporated by reference herein. In some embodiments, packet classification unit 106 may also include or have an associated well-known network search engine (not shown for simplicity).

Traffic management unit 108 schedules packets for transmission according to the QOS policies, SLA parameters, and/or other information provided to traffic management unit 108. Traffic management unit 108 can be configured to identify and independently process individual traffic flows, and therefore can queue, shape, police, terminate, and/or throttle selected traffic flows and/or selected types of traffic.

In operation, traffic management unit 108 generates a token and a departure time for each accepted packet. The tokens are used to identify and track corresponding packets in system 100. For some embodiments, each token is provided to packet buffer memory 102 via bus 118 and used to address a storage location in packet buffer memory 102 into which the payload of the corresponding packet is stored. The packets are queued for transmission according to their departure times. The departure times can be generated according to traffic type, relative to other packets in the same flow, or by any other suitable queuing technique. For some embodiments, the departure times are selectively compared with each other to determine which departure time is the earliest, and the packet corresponding to the earliest departure time is selected for transmission. The payload of the selected packet, which can be retrieved from packet buffer memory 102 using the packet's token, is provided to output interface 112 via bus 122. Network processing unit 104 and/or output interface 112 re-assembles the packet's header and payload, which are then provided to output bus 126 for transmission. In addition, output interface 112 can provide feedback information such as, for example, network congestion information, to traffic management unit 108 via bus 124.

For some embodiments, traffic management unit 108 also provides updated link and other packet information to output interface 112 via bus 124. Traffic management unit 108 can also provide statistical information via bus 120 to host interface 113, which in turn may communicate the statistical information via bus 130 to a host system such as, for example, a network administrator.

Host interface 113 can provide instructions and other control information received from bus 130 to network processing unit 104, packet classification unit 106, and traffic management unit 108 via bus 120. These instructions and control information can include, for example, throttle control instructions, traffic termination instructions, and/or network congestion information.

System 100 may be implemented within various types of networks (e.g., LAN, WAN, VPN, the Internet, and so on). For example, in one embodiment, system 100 may be a line card in a network router, in which case bus 128 may be connected to a network node, and bus 126 may be connected to an input node of the router.

Figure 2:
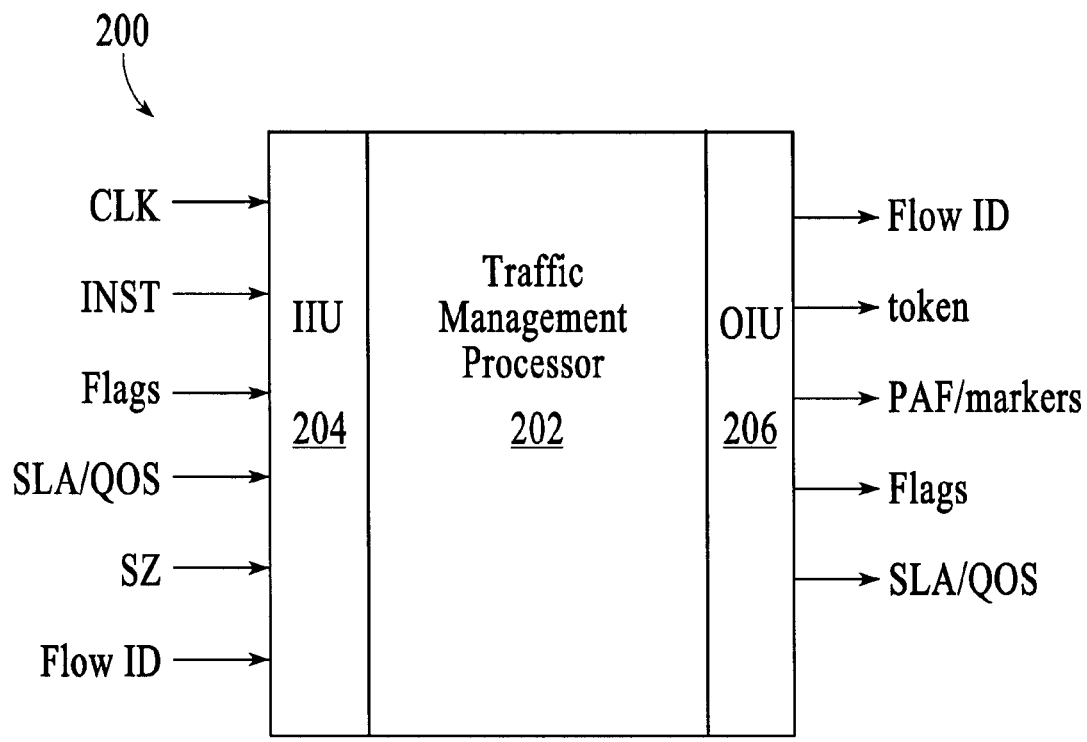
FIG. 2 is a simplified block diagram illustrating input and output connections for one embodiment of the traffic management processor of FIG. 1.

FIG. 2 shows input and output connections for one embodiment of traffic management unit 108 of FIG. 1. Traffic management unit 200 includes a traffic management processor 202 coupled to an input interface unit (IIU) 204 and to an output interface unit (OIU) 206. IIU 204 receives a clock signal CLK, one or more instructions INST, one or more input flags, various well-known SLA and QOS parameters, a flow identification (ID), a packet size SZ, and/or other well-known signals or information. For example, although not shown for simplicity, IIU 204 can receive control information from a host or network administrator. The control information can include, for example, congestion control information, one or more bits that select a scheduling technique for UBR traffic flows (e.g., WFQ, FCFS, and the like), and other control information.

Instructions, addresses and commands can be provided to traffic management processor 108 on various buses as illustrated in the exemplary embodiment of FIG. 2. Each of the buses is preferably a multi-conductor signal path. Also, in alternative embodiments, one or more of the buses may be eliminated and the corresponding signals time-multiplexed onto another of the buses.

The flow ID indicates to which traffic flow a corresponding packet belongs, and as explained in detail below can be used to identify and process individual traffic flows through system 100. For some embodiments, each traffic flow is assigned a unique flow ID. The flow IDs may be generated by network processing unit 104, included in each packet header, or provided from another suitable source. The SLA/QOS parameters, which can include the traffic type (e.g., CBR, VBR, ABW, and UBR), a maximum allowable delay for the traffic flow, a negotiated bandwidth (BW) for the traffic flow, jitter control information, link information, priority, and other data, can be included in each packet header or, alternately, can be provided by a network administrator and stored in an associated memory (not shown). The packet size parameter (SZ), which indicates the size of a corresponding packet, can be calculated in a well-known manner by network processing unit 104, or alternately provided in the packet's header.

OIU 206 outputs the flow IDs, the SLA/QOS parameters, CLK, the tokens, output flags, a packet accept flag (PAF), one or more markers, and/or other information (not shown for simplicity). The PAF indicates whether a packet has been accepted or rejected by system 100. The markers indicate whether packets of a corresponding traffic flow have exceeded an allowable bandwidth, as explained in more detail below with respect to FIG. 15.

Figure 3:
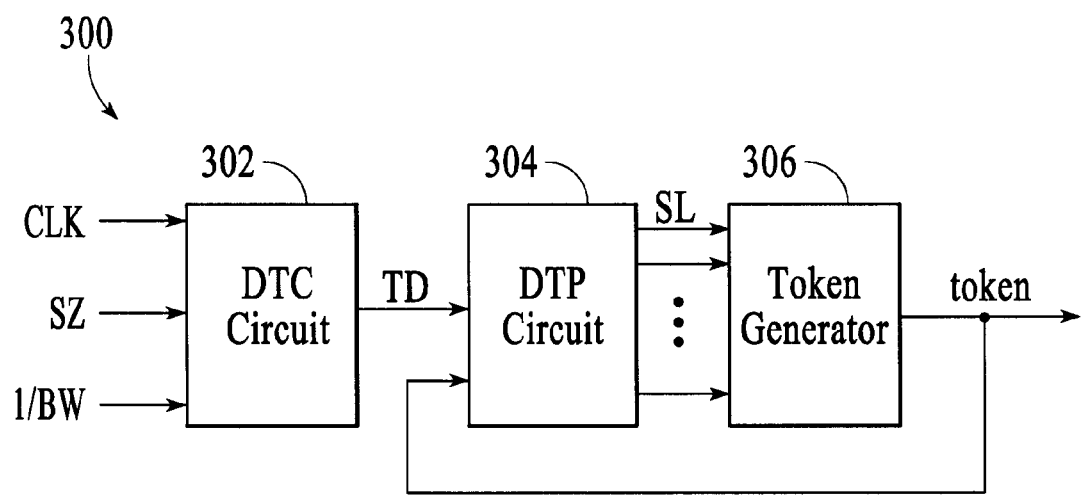
FIG. 3 is a simplified functional block diagram of one embodiment of the traffic management processor of FIG. 2.

FIG. 3 shows a simplified block diagram of a traffic management processor 300 that is one embodiment of traffic management processor 202 of FIG. 2. Traffic management processor 300 includes a departure time calculator (DTC) circuit 302, a departure time prioritizer (DTP) circuit 304, and a token generator 306. Together, DTC circuit 302 and DTP circuit 304 form a scheduler block that schedules packets for transmission according to their departure times.

DTC circuit 302 includes well-known circuitry that can be configured to calculate departure times TD for packets belonging to traffic flows that have a CBR, a VBR, an ABW, and/or an UBR. For the exemplary embodiment of FIG. 3, DTC circuit 302 is shown to include inputs to receive 1/BW, SZ, and CLK, although for other embodiments DTC circuit 302 may include additional inputs to receive other information to calculate packet departure times. For example, for UBR traffic flows, DTC circuit 302 can be configured to calculate a packet's departure time TD using the well-known WFQ expression TD=TA+SZ/BW, where TA is the arrival time of the packet. Alternately, DTC circuit 302 can be configured to calculate a packet's departure time using the well-known FCFS expression TD=TA+C, where C is a constant value. The value C can be provided as input to DTC 302, or alternately stored within DTC circuit 302.

As illustrated in FIG. 3, the 1/BW parameter is provided as an input to DTC circuit 302. 1/BW can be calculated from BW in a well-known manner. For some embodiments, DTC circuit 302 can receive BW as an input and derive 1/BW. For example, 1/BW can be calculated from BW using a well-known arithmetic logic unit (not shown), or can be accessed from a look-up table (not shown) in response to BW.

For some embodiments, DTC circuit 302 includes a counter (e.g., a binary counter) that increments in response to state transitions of CLK to generate TA, and includes a arithmetic logic unit (ALU) to calculate TD from TA and 1/BW (e.g., for WFQ scheduling techniques) or from TA and C (e.g., for FCFS scheduling techniques). For simplicity, the counter and ALU are not shown in FIG. 3. Thus, the arrival times TA and departure times TD used in present embodiments are counter values that represent time, e.g., the temporal relationship between packet arrivals and/or packet departures. Accordingly, the WFQ expression for determining TD may be expressed as TD=TA+SZ/(BW*T), where T is the period of CLK. For simplicity, however, TA and TD are referred to herein as arrival times and departure times, respectively. For one embodiment, the counter is a conventional 32-bit counter, and CLK has a frequency of 100 MHz (and thus a period T of 10 nanoseconds).

Referring again to FIG. 3, DTP circuit 304 has a first input to receive a departure time from DTC circuit 302, has a second input to receive a token from token generator 306, and includes a plurality of storage locations (not shown for simplicity in FIG. 3) to store the departure times for a corresponding plurality of packets. For some embodiments, the departure times of all packets are queued in DTP circuit 304, regardless of which type of traffic the packet belongs to. Further, the departure times can be stored in DTP circuit 304 in any order, regardless of priority.

Token generator 306 includes a plurality of inputs coupled to corresponding storage locations in DTP circuit 304 via corresponding select lines SL, and includes an output to generate the tokens. For some embodiments, token generator 306 is a conventional priority encoder that generates the tokens in response to signals on SL. For one embodiment, DTP circuit 304 and token generator 306 form a programmable priority encoder.

When a packet is accepted by traffic management processor 300, token generator 306 generates a token to identify and track the packet through system 100. For some embodiments, the token is the next free address or location into which a departure time can be stored in DTP circuit 304. The token is provided to packet buffer memory 102, which in turn stores the packet's payload at an address indicated by the token. After calculating TD, DTC circuit 302 forwards TD to DTP circuit 304, which in turn stores TD at a storage location addressed by the token. Thus, for some embodiments, the token generated for each packet can be used to address the packet's departure time in DTP circuit 304 and to address the packet's payload in packet buffer memory 102.

To schedule a packet for departure, DTP circuit 304 determines which of the departure times stored therein is the earliest, e.g., which TD has the lowest counter value. For some embodiments, DTP circuit 304 compares selected departure times stored therein with each other to determine which departure time is the earliest. Token generator 306 generates a token that is the index or address of the storage location in DTP circuit 304 containing the earliest TD. In this manner, DTP circuit 304 operates as a queuing mechanism for packets processed by system 100.

Figure 4:
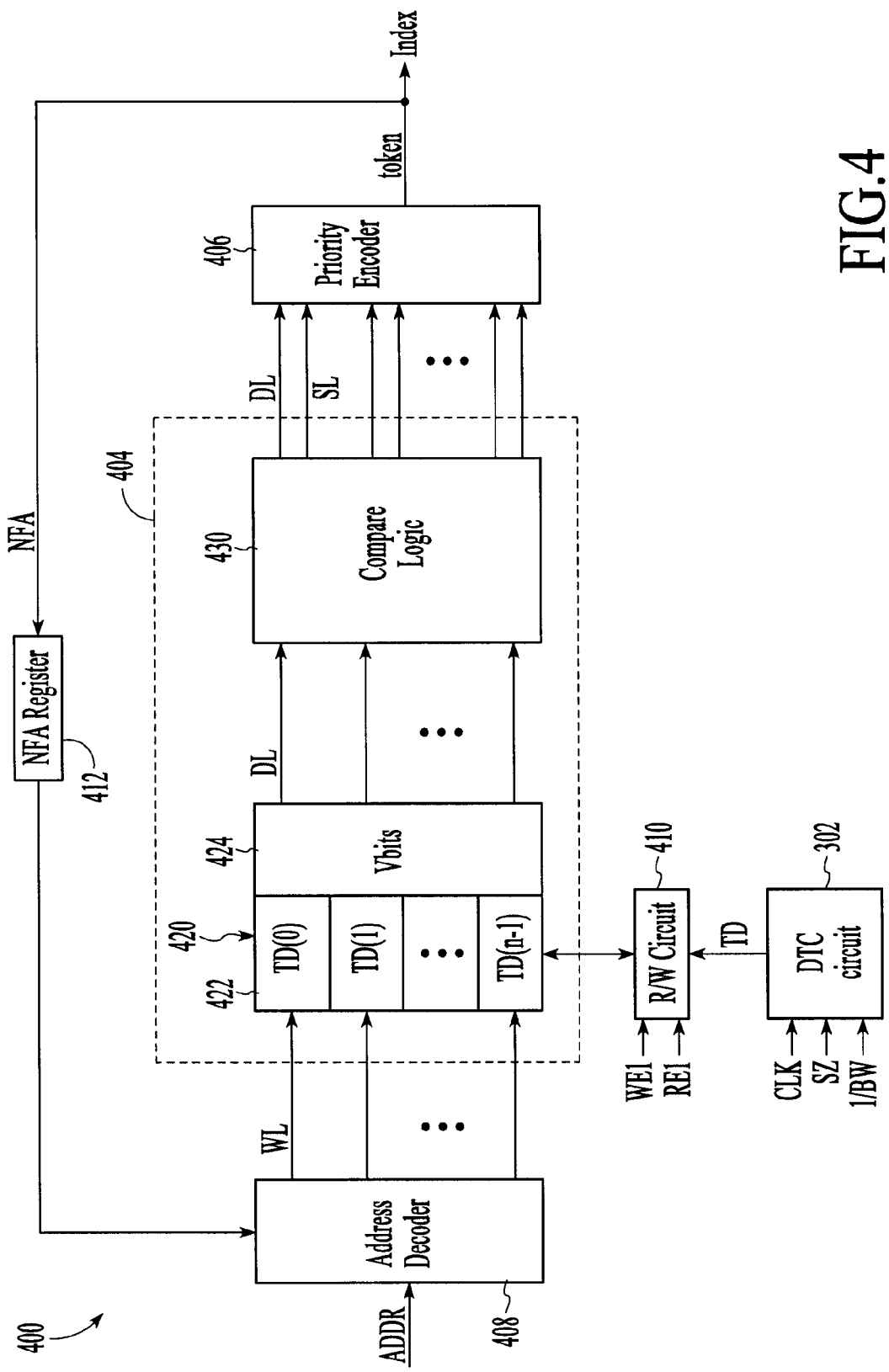
FIG. 4 is a block diagram of an embodiment of the traffic management processor of FIG. 3 configured to compare departure times with each other.

FIG. 4 shows a block diagram of a traffic management processor 400 that is one embodiment of traffic management processor 300 of FIG. 3. Traffic management processor 400, which is configured to process traffic flows having an UBR, includes the DTC circuit 302 of FIG. 3, as well as a DTP circuit 404, a priority encoder 406, an address decoder 408, a read/write circuit 410, and a next free address (NFA) register 412. Priority encoder 406, which is one embodiment of token generator 306 of FIG. 3, is well-known. Read/write circuit 410, which can include well-known writer driver and sense amplifiers, includes a first input/output (I/O) port coupled to an I/O port of DTC circuit 302, a second I/O port coupled to an I/O port of DTP circuit 404, and inputs to receive a read enable signal RE1 and a write enable signal WE1. Although not shown for simplicity, traffic management processor 400 also includes an instruction decoder to provide control signals to address decoder 408, DTC circuit 302, DTP circuit 404, priority encoder 406, address decoder 408, and read/write circuit 410 in response to instructions received by processor 400. In addition, other well-known signals such as, for example, clock signals, are not shown for simplicity.

DTP circuit 404 is one embodiment of DTP circuit 304 of FIG. 3, and is shown to include a departure time table 420 and compare logic 430. Table 420 can be any suitable addressable storage device. For some embodiments, table 420 is a dual-ported CAM device. For other embodiments, table 420 is a dual-ported static random access memory (SRAM). Table 420 is coupled to read/write circuit 410, and includes a plurality of rows 422, each for storing a departure time TD for a corresponding packet. The rows 422 of table 420 are coupled to address decoder 408 via corresponding word lines WL, and are coupled to compare logic 430 and to priority encoder 406 via corresponding data lines DL. Further, each row 422 of table 420 includes a valid bit (V-bit) 424 that indicates whether the corresponding row 422 stores a valid departure time.

Compare logic 430 includes inputs to receive the departure times TD(0)-TD(n-1) from corresponding rows of table 420 via data lines DL, and includes outputs coupled to priority encoder 406 via corresponding select lines SL. Compare logic 430 is configured to compare the departure times TD(0)-TD(n-1) provided by table 420 with each other to determine which of the departure times is the earliest (e.g., which TD has the lowest counter value). In response thereto, compare logic 430 asserts the select line corresponding to the row 422 in table 420 that stores the earliest departure time. For some embodiments, table 420 and compare logic 430 can be formed as a priority index table as described, for example, in the above-referenced co-pending and commonly owned U.S. patent application Ser. No. 09/406,170. For one embodiment, a plurality of latches (not shown for simplicity) are provided to selectively enable corresponding rows 422 of table 420 to provide the departure times TD(0)-TD(n-1) to compare logic 430. For other embodiments, other suitable techniques can be used to determine which row 422 in table 420 contains the earliest TD.

In response to the asserted select line(s) SL, priority encoder 406 generates a token that is the address or index of the row 422 in table 420 containing the earliest TD. The token, which identifies the packet having the earliest TD, can be used to retrieve the packet's payload from packet buffer memory 102, as described above. In addition, priority encoder 406 is configured to generate a token that is the next free address (NFA) available in table 420 in response to the V-bits 424 in a well-known manner. The NFA may be the numerically lowest available address, the numerically highest available address, or any other predetermined address. Priority encoder 406 provides the NFA token to NFA register 412 for storage. For some embodiments, DTP circuit 404 and priority encoder 406 can be formed as a programmable priority encoder.

Figures 5A, 5B:
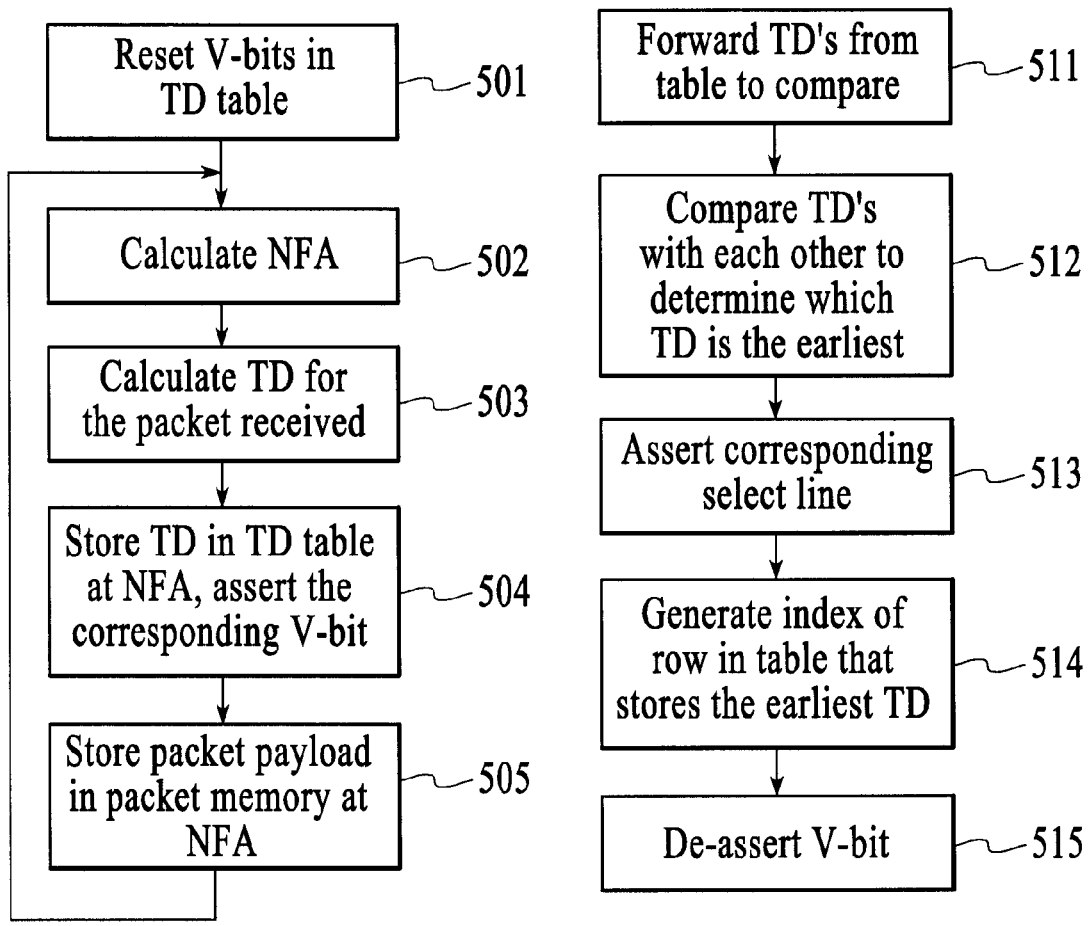
FIG. 5A is a flow chart illustrating an exemplary operation for storing departure times in one embodiment of the traffic management processor of FIG. 4.
FIG. 5B is a flow chart illustrating an exemplary operation for scheduling packets for transmission in one embodiment of the traffic management processor of FIG. 4.

An exemplary operation for storing departure times in table 420 of traffic management processor 400 is described below with respect to the illustrative flow chart of FIG. 5A. Upon reset or power-up, the V-bits 424 are initially de-asserted (e.g., to logic 1) to indicate that table 420 is empty, e.g., that none of rows 422 contain valid departure times (501). In response to the de-asserted V-bits 424, priority encoder 406 generates the lowest logical address (e.g., "00") in table 420 as the NFA token, which in turn is stored in NFA register 412 (502). When a packet is received (e.g., accepted) by system 100, DTC circuit 302 calculates a departure time TD for the packet (503). The departure time TD is stored in the row 422 of table 420 indicated by the NFA token, and the corresponding V-bit 424 is asserted (e.g., to logic 0) to indicate the addressed row 422 stores a valid TD (504).

For example, to store the TD in table 420, NFA register 412 forwards the NFA to address decoder 408, which in turn decodes the NFA to select a row 422 in table 420 by asserting its word line WL. DTC circuit 302 forwards TD to read/write circuit 410. A write enable signal WE1 is asserted, for example, by an instruction decoder or by another control circuit or logic, and in response thereto read/write circuit 410 writes the TD to the selected row 422 of table 420. The corresponding V-bit 424 is asserted, for example, by instructing read/write circuit 410 to write a logic low value thereto.

The packet's payload is then stored at a location in packet buffer memory 102 addressed by the NFA (505). Thereafter, the V-bits 424 are provided from table 420 to priority encoder 406 via lines DL and, in response thereto, priority encoder 406 generates a new NFA that is stored in NFA register 412 (502). Departure times for additional packets received by system 100 are calculated and stored in departure time table 420 as described above (503-505).

The packet departure times may be stored in any order in table 420, irrespective of priority (e.g., regardless of which departure times are earlier than others). In this manner, each packet may be assigned to any token generated by priority encoder 406. As a result, table 420 does not require any table management overhead to re-order or to otherwise prioritize the departure times TD(0)-TD(n-1) stored therein.

In addition, the departure times TD(0)-TD(n-1) may be read from table 420 in any suitable manner. For example, address decoder 408 may enable one of word lines WL of table 420 in response to an address (e.g., the NFA from NFA register 412 or an externally generated address ADDR). The read enable signal RE1 is asserted, and the TD stored in the row 422 of table 420 selected by address decoder 408 is read to read/write circuit 410, which in turn may output the TD to a corresponding output bus (not shown for simplicity).

An exemplary operation for scheduling packets processed for transmission by traffic management processor 400 is described below with respect to the illustrative flow chart of FIG. 5B. To select a particular packet for departure, table 420 provides all the departure times TD(0)-TD(n−1) stored therein to compare logic 430 (511). In response thereto, compare logic 430 compares the departure times TD(0)-TD(n−1) with each other to determine which departure time is the earliest, e.g., which TD has the lowest counter value (512), and asserts the corresponding select line SL (513). For some embodiments, compare logic 430 considers (e.g., receives from table 420) only those departure times TD(0)-TD(n−1) that have an asserted V-bit 424. In response to the asserted select line SL, priority encoder 406 generates a token that is the index of the row 422 in table 420 that stores the earliest departure time (514). The V-bit 424 for the row 422 is de-asserted (e.g., to logic 1) so that the row 422 is available for storing a departure time for another packet (515). Thereafter, the corresponding packet's payload is retrieved from the location in packet buffer memory 102 addressed by the token, and the packet is transmitted from system 100.

If there are multiple entries in table 420 that have the same earliest departure time, compare logic 430 asserts the select lines SL for all such rows 422. Priority encoder 406 then determines which of these rows 422 has the lowest index and provides that index as the token to packet buffer memory 102, which in turn selects the corresponding packet payload for transmission. The corresponding V-bit 424 is then de-asserted to invalidate the table entry corresponding to the departed packet. The non-selected earliest departure time(s) remains in table 420, and can be selected during a next compare operation in compare logic 430.

As described above, traffic management processor 400 compares the departure times for corresponding packets with each other to determine which departure time is the earliest, and then transmits the corresponding packet. Accordingly, traffic management processor 400 selects a packet for departure in response to every compare operation in compare logic 430, independent of any current time value, thereby optimizing packet transmission rates by allowing packets to be continually transmitted from system 100.

In contrast, prior art systems that compare departure times with a current time value to select packets for departure may experience idle time during which no packets are transmitted if there is not a match between the current time value and any of the packet departure times. Further, these prior art systems are not suited to handle multiple match conditions. For example, if the current time value matches more than one of the calculated packet departure times, the prior art system selects a packet corresponding to one of the matching departure times for transmission, and then increments the current time value for the next compare operation. As a result, packets corresponding to the non-selected departure times that match the previous search key (current time) value may not be selected for transmission during subsequent departure time compare operations.

For some embodiments, a rollover bit is used to prevent overflow conditions in DTC circuit 302's counter (counter not shown in FIGS. 3 and 4) from stranding departure times stored in departure time table 420. For example, when the counter's value reaches its maximum (e.g., all 1's), the counter value is reset to its minimum (e.g., all 0's). If packets have departure times in table 420 that are at or near the maximum counter value and are not selected for departure before the counter value is reset, then subsequently generated packet departure times may have a value that is lower than the existing departure time entries in table 420, which in turn can result in an inadvertent re-ordering of packets.

Figure 18:
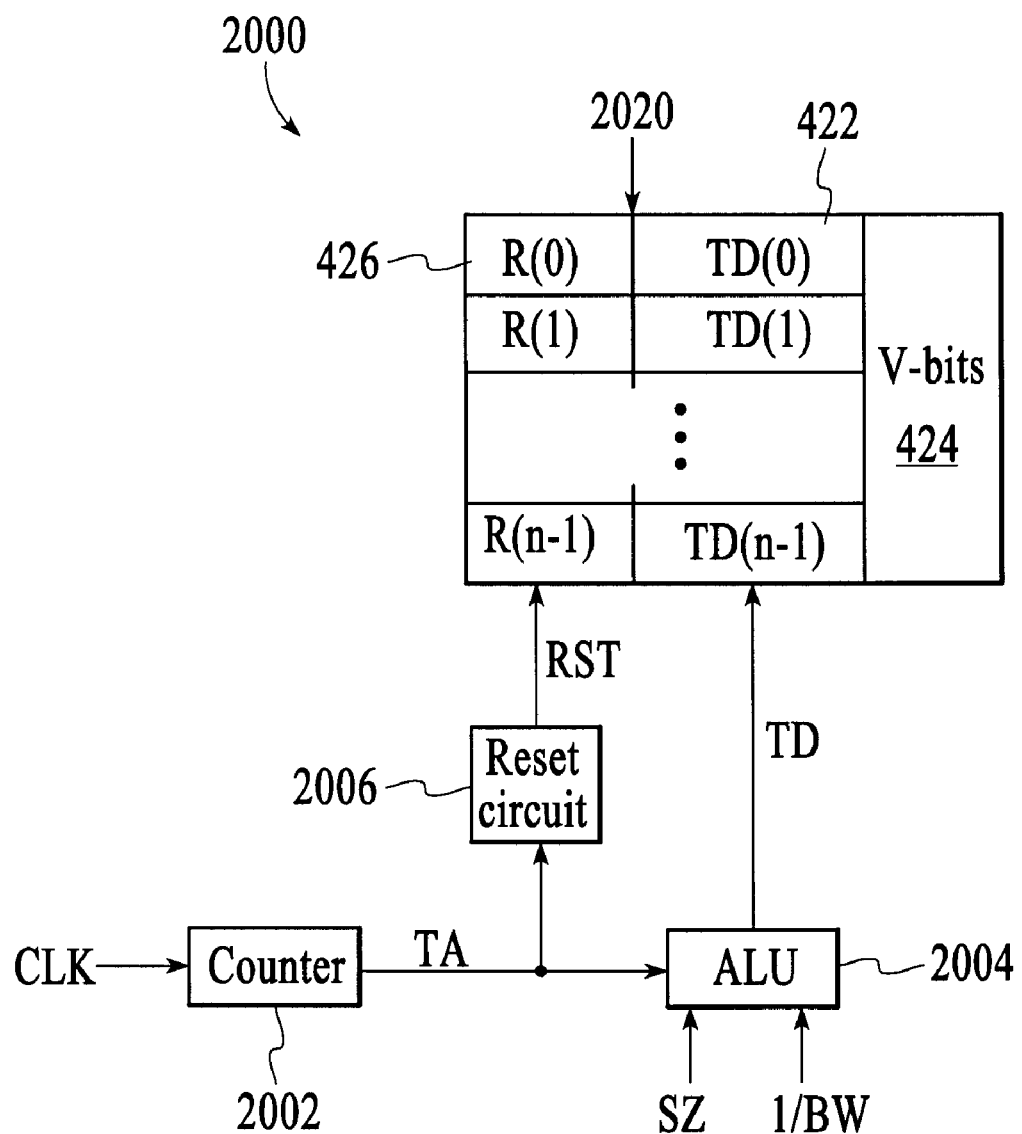
FIG. 18 is a block diagram of a portion of one embodiment of the traffic management processor of FIG. 4.

FIG. 18 shows a portion 2000 of one embodiment of traffic management processor 400 configured to prevent overflow conditions in DTC circuit 302's counter from inadvertently re-ordering packets. Portion 2000 is shown to include a departure time table 2020, a counter 2002, an ALU 2004, and a reset circuit 2006 (for simplicity, other elements of traffic management processor 400 are not shown in FIG. 18). Table 2020 includes all the elements of table 420 of FIG. 4, with the addition of a rollover bit (R-bit) 426 included in each row 422 of table 2020. For some embodiments, each R-bit 426 forms the most significant bit (MSB) of the corresponding departure time (TD) stored in table 2020. Counter 2002, which can be any well-known binary counter, increments TA in response to state transitions of CLK. TA is provided as an input to ALU 2004, which generates TD in response to TA, SZ, and 1/BW as described above with respect to FIG. 4. Together, counter 2002 and ALU 2004 form a DTC circuit that is one embodiment of DTC circuit 302. TA is also provided to reset circuit 2006, which for some embodiments is an AND gate.

Counter 2002 is an n-bit counter that provides an n-bit TA to ALU 2004, which in turn generates an n-bit TD for storage in a selected row 422 of table 2020. Thus, each TD can have any one of $2^n$ values. When the output value (e.g., TA) of counter 2002 reaches its maximum value of all 1's reset circuit 2006 asserts a reset signal (RST) that resets the R-bit 426 (e.g., to logic 0) for all TD entries in table 2020. Thereafter, for each new TD entry stored in table 2020 after counter 2002 is reset to its minimum value of all 0's, the R-bit 426 is set (e.g., to logic 1) so that the new TD entries will have higher departure time values than existing TD entries, thereby preserving the packet departure order.

For some embodiments, more than one rollover bit may be provided and/or stored in each row of the TD table. For example, it may be necessary to have more than one rollover bit to accommodate departure times that span a time period larger than twice the maximum counter value that can be stored in rows 422.

For other embodiments, traffic management processors of the present invention can be configured to schedule packets that belong to different traffic types. For example, it may be desirable to simultaneously process traffic flows having an unspecified bit rate (UBR) and a constant bit rate (CBR) using the same queuing mechanism. As mentioned above, CBR traffic flows typically specify the bit rate at which their packets are transmitted, regardless of available bandwidth. Thus, in contrast to UBR packets that are scheduled for departure as soon as possible, CBR packets are scheduled for departure within a specified departure window.

Figure 6:
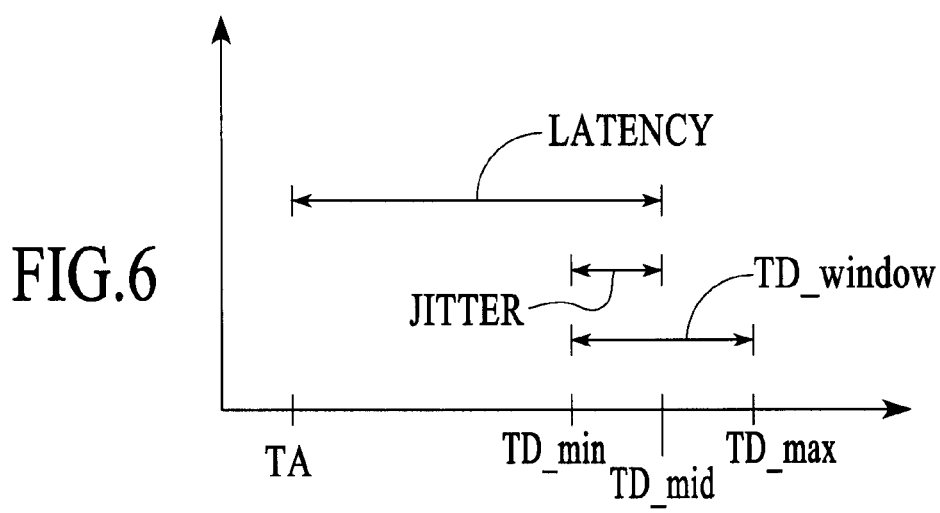
FIG. 6 is a graph illustrating the departure window for CBR traffic flows.

For some embodiments, the header of each packet in a CBR traffic flow includes a latency value (LAT) and a jitter value (JIT) that are used to determine the departure window for the packet. For example, referring to FIG. 6, the departure window (TD_window) for a CBR packet may be expressed as TD_window=TA+(LAT±JIT). Thus, the minimum departure time at which a CBR packet is transmitted is given by TD_min=TA+LAT−JIT, and the maximum departure time at which a CBR packet is transmitted is given by TD_max=TA+LAT+JIT.

Figure 7:
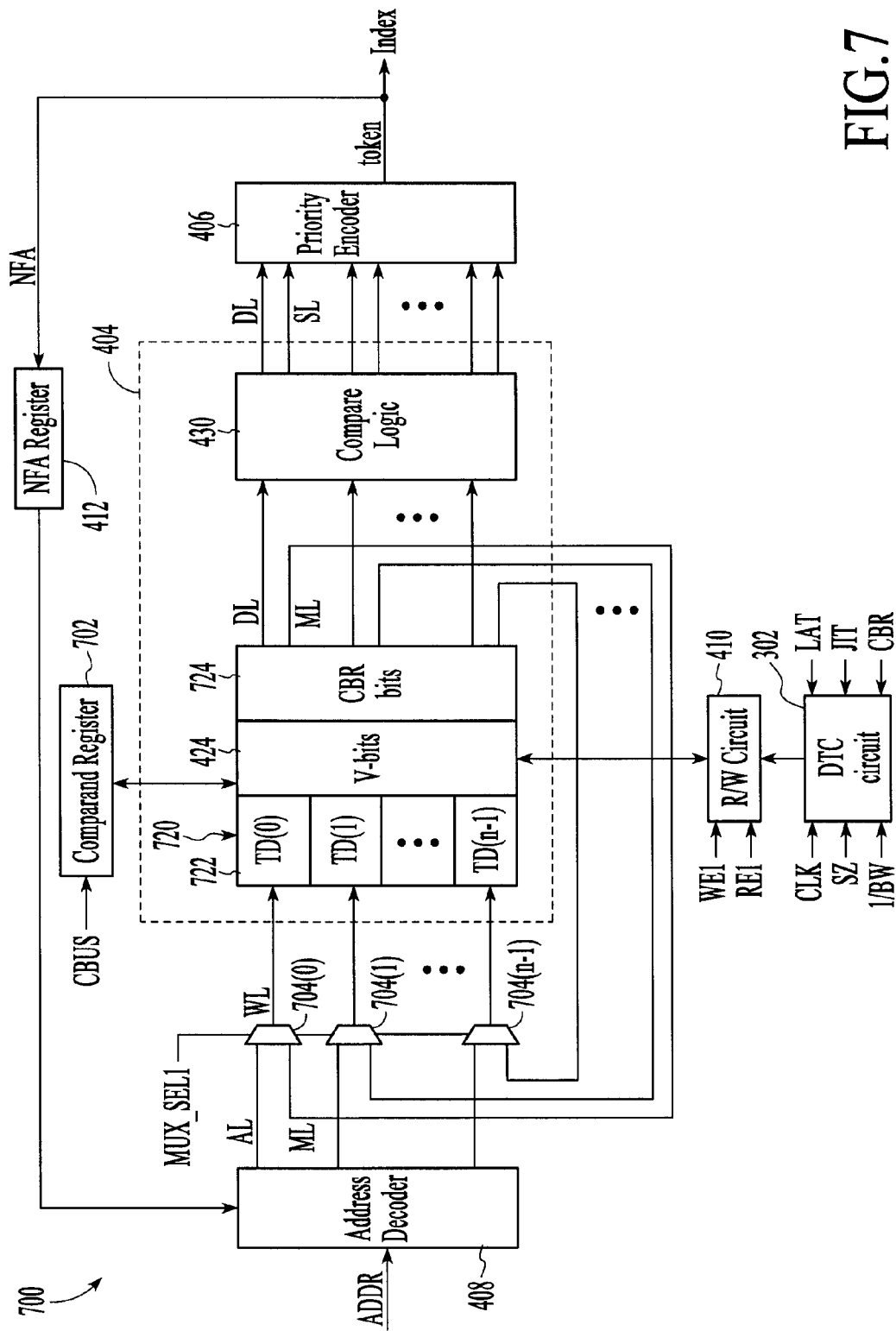
FIG. 7 is a block diagram of an embodiment of the traffic management processor of FIG. 3 configured to process different types of traffic flows.

FIG. 7 shows a traffic management processor 700 that is configured to process both CBR packets and UBR packets using the same queuing mechanism. Traffic management processor 700 includes all the elements of traffic management processor 400 of FIG. 4, except that table 420 of DTP circuit 404 is replaced with a CAM device 720 that has an input port coupled to a comparand register 702. Comparand register 702 is well-known, and is configured to provide a search key (e.g., a comparand word) from a comparand bus CBUS to CAM device 720 for comparison with entries stored therein. For other embodiments, the search key can be provided to CAM device 720 via another bus and/or circuit.

CAM device 720 can be any suitable CAM device including, for example, synchronous or asynchronous CAM devices having binary, ternary, or quaternary CAM cells. For some embodiments, CAM device 720 is dual-ported. CAM device 720 includes a plurality of rows 722 of CAM cells, each for storing the departure time TD for a corresponding packet. Each row 722 of CAM cells is coupled to compare logic 430 via a corresponding data line DL, and is coupled to a corresponding word line WL and match line ML. The word lines WL are coupled to outputs of corresponding multiplexers (MUXes) 704(0)-704(n−1), each of which includes a first input coupled to address decoder 408 via a corresponding address line, a second input coupled to a corresponding match line, and a control terminal to receive a select signal MUX_SEL1. Thus, MUXes 704(0)-704(n−1) allow CAM rows 722 to be selected by address lines AL (e.g., when MUX_SEL1 is de-asserted to logic 0) or by match lines ML (e.g., when MUX_SEL1 is asserted to logic 1). For other embodiments, other circuitry can be employed to select rows 722 of CAM device 702 for read and write operations in response to either address decoder 408 or match conditions indicated on match lines ML.

Further, each CAM row 722 contains extra storage locations (e.g., CAM cells, SRAM cells, latches, or other suitable storage elements) for storing the V-bit 424 and a CBR bit 724 for the row. The CBR bits 724 indicate whether departure times stored in corresponding rows 722 correspond to CBR packets or to UBR packets. For some embodiments, the header of each packet processed by traffic management processor 700 includes a CBR bit that indicates whether the packet is part of a CBR traffic flow or is part of an UBR traffic flow. For one embodiment, CBR packets have asserted (e.g., logic 1) CBR bit, and UBR packets have a de-asserted (e.g., logic 0) CBR bit.

Further, DTC circuit 302 is shown in FIG. 7 to include additional inputs to receive the latency value (LAT), the jitter value (JIT), and the CBR bit from each packet header, and is configured to calculate departure times for UBR packets and to calculate departure windows for CBR packets. For some embodiments, if the CBR bit for a packet is not asserted, which indicates the packet is part of an UBR traffic flow, DTC circuit 302 calculates the packet's departure time using the WFQ expression TD=TA+SZ/BW, as described above with respect to FIGS. 3 and 4. Alternately, DTC circuit 302 can calculate the departure time for UBR packets using the FCFS expression TD=TA+C. Conversely, if the CBR bit for a packet is asserted, which indicates the packet is part of a CBR traffic flow, DTC circuit 302 calculates the packet's departure time using the expression TD=TA+LAT−JIT, as described above with respect to FIG. 6.

The departure times TD(0)-TD(n−1) for both CBR packets and UBR packets are stored in rows of CAM 720 in a well-known manner using read/write circuit 410. For example, MUX_SEL1 is de-asserted (e.g., to logic 0), and address decoder 408 asserts a word line WL via a corresponding address line AL and MUX 704 in response to NFA to select a row 722 in CAM device 720. DTC circuit 302 provides the calculated packet departure time to read/write circuit 410 which, in response to an asserted WE1, writes the departure time to the CAM row 722 selected by address decoder 408.

The departure times in CAM device 720 for CBR packets are not provided to compare logic 430 until the departure times are within the departure time windows calculated for each packet. For example, for some embodiments, device 720 is configured to provide only those departure times stored in rows 722 that have an asserted V-bit 424 and a de-asserted CBR bit 724 to compare logic 430. As a result, compare logic 430 compares only the valid departure times for UBR packets with each other to determine which departure time is the earliest. The packet corresponding to the earliest departure time is then selected for departure as described above.

To select CBR packets for departure, CAM device 720 is also configured to compare a current time value with those departure times in rows 722 that correspond to CBR packets (e.g., those departure times in CAM 720 having an asserted CBR bit 724). If there is a match, which indicates that the departure time for a corresponding CBR packet is within its departure time window, the CBR bit 724 of the matching departure time is de-asserted, which in turn allows the departure time to be subsequently provided to compare logic 430 to determine which departure time is the earliest. In this manner, when the departure time of a CBR packet matches the current time value, the CBR packet may be selected for departure by compare logic 430.

For some embodiments, the current time value is a counter value generated by a conventional binary counter in response to state transitions of CLK and provided to CAM 720 as a search key via comparand register 702. For example, the current time value can be calculated by DTC circuit 30. For some embodiments, DTC circuit 302 provides the current value for TA as the search key to CAM device 720.

Figure 8:
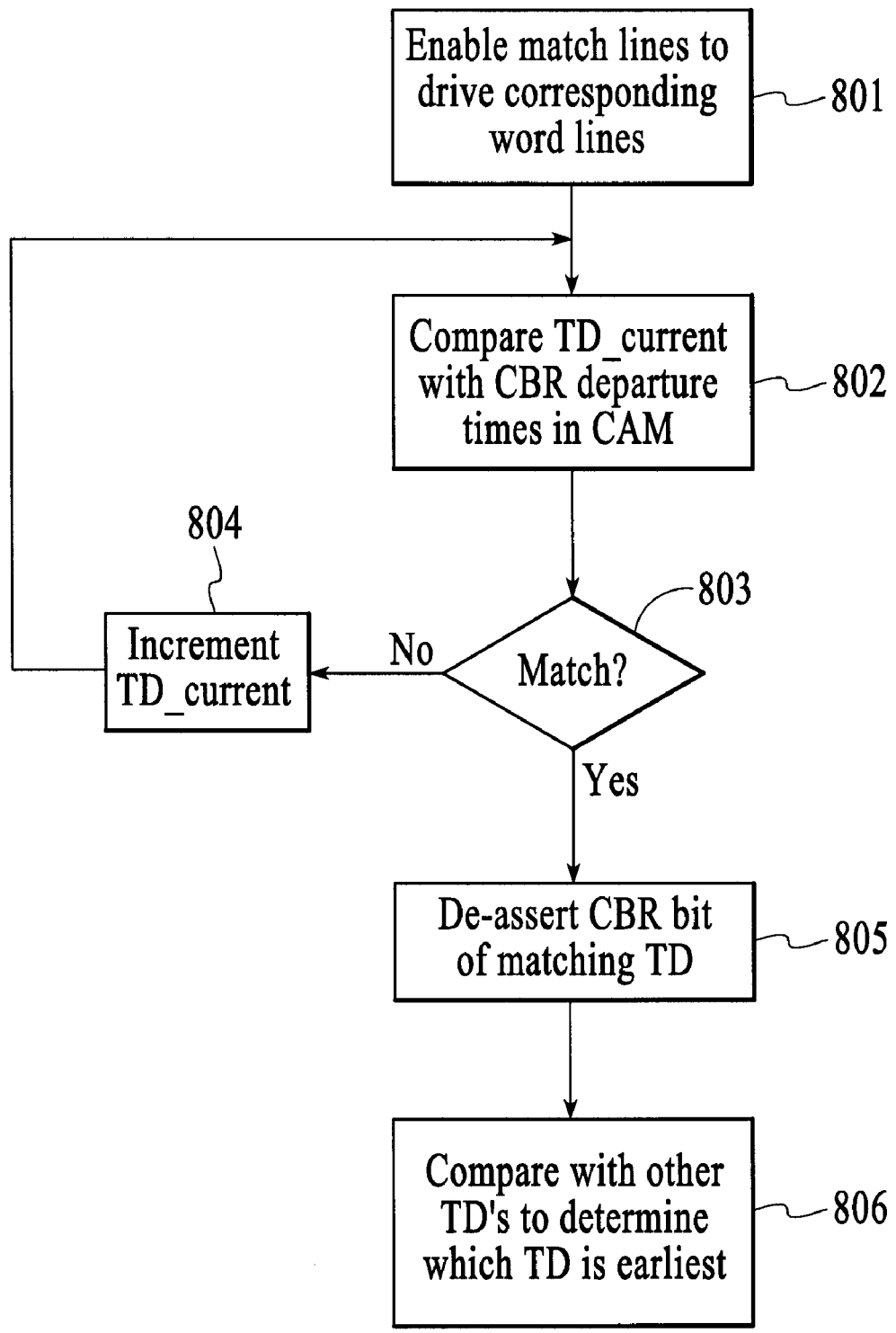
FIG. 8 is a flow chart illustrating an exemplary operation for processing CBR traffic and UBR traffic in one embodiment of the traffic management processor of FIG. 7.

An exemplary compare operation between the current time value and the CBR departure times in CAM device 720 is described below with respect to the flow chart of FIG. 8. First, the match lines ML of CAM device 720 are enabled to drive corresponding word lines WL of CAM device 720 (801). For example, MUX_SEL1 is asserted (e.g., to logic 1) so that an asserted match line ML can drive the word line WL for the corresponding CAM row 722 via its MUX 704. Then, the current time value is compared with the departure times TD(0)-TD(n−1) having asserted CBR bits to generate match results on match lines ML (802). Alternately, the compare operation can be performed before the match lines are enabled to drive the word lines. If there is not a match, as tested at 803, the current time value is incremented (804), and processing continues at 802.

Conversely, if there is a match in response to the compare operation, the match line ML of the matching CAM row 722 is asserted, which in turn selects the matching CAM row 722 for a write operation by asserting its word line WL via the corresponding MUX 704. Read/write circuit 410 de-asserts the CBR bit, for example, by writing a logic 0 value to the CBR bit location 724 of the selected CAM row. The matching departure time, which now has a de-asserted CBR bit 724, is provided to compare logic 430 for comparison with other departure times from CAM device 720 to determine which departure time is the earliest (806).

Thus, by de-asserting the CBR bit of the matching departure time, the corresponding CBR packet is re-classified as an UBR packet whose departure time is allowed to participate in determining which packet is selected for departure. Accordingly, each CBR packet is enabled to be scheduled for departure by compare logic 430 at the beginning of the packet's departure window, e.g., when TD_current=TD_min. In this manner, CAM 720 operates as a queuing mechanism for both CBR and UBR packets, whereby the CBR packets are allowed to participate with the UBR packets for departure selection in compare logic 430 when the CBR packets are within their corresponding departure windows.

Figure 9:
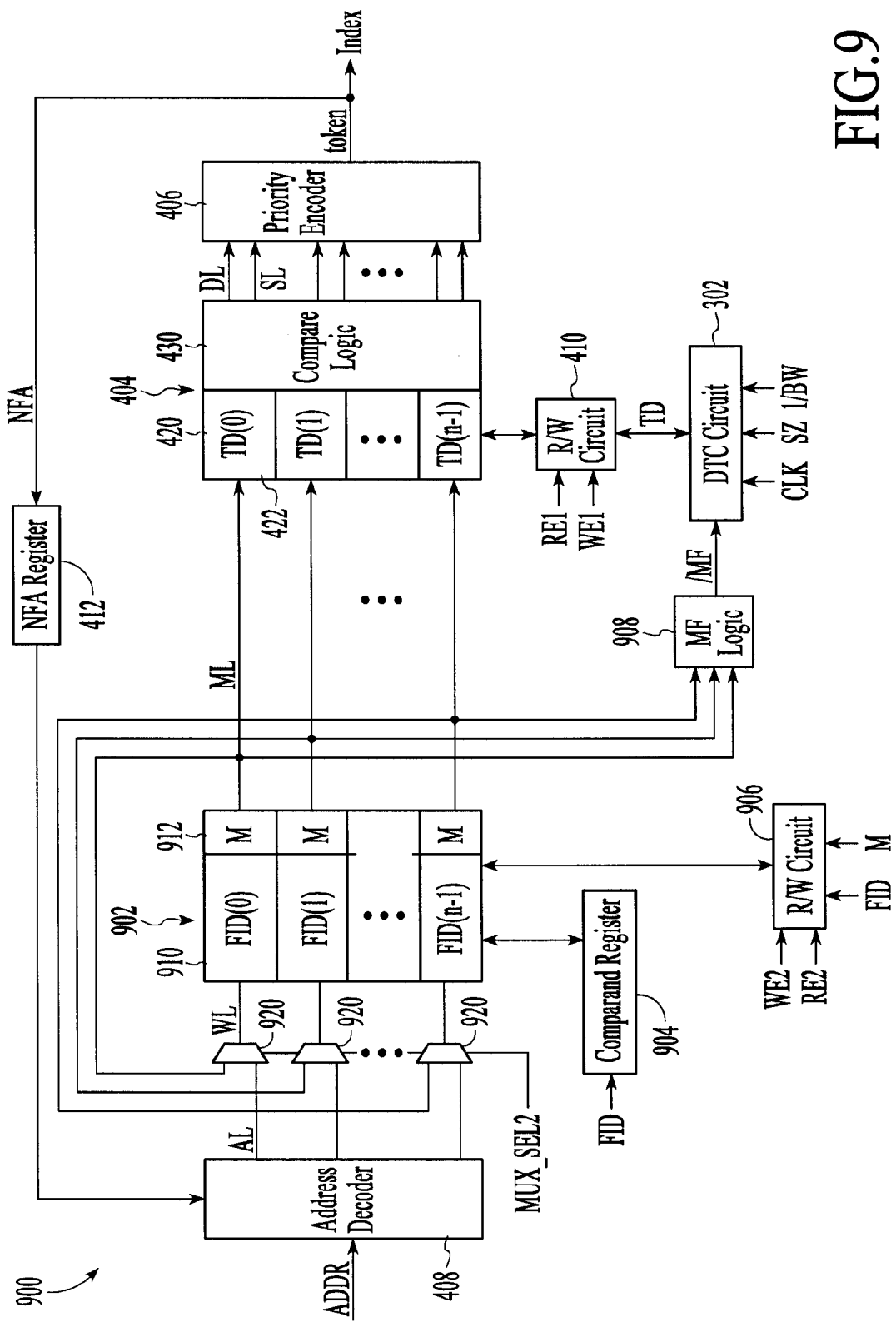
FIG. 9 is a block diagram of an embodiment of the traffic management processor of FIG. 3 configured to detect and shape individual traffic flows.

For other embodiments, it may be desirable to detect and independently manage individual traffic flows, for example, to provide different QOS parameters to different traffic flows. FIG. 9 shows a traffic management processor 900 that is another embodiment of traffic management processor 300 of FIG. 3. Traffic management processor 900, which is configured to detect and process individual traffic flows, can implement shaping and scheduling functions on a per-flow basis. Traffic management processor 900 includes all of the elements of traffic management processor 400 of FIG. 4, with the addition of a content addressable memory (CAM) device 902, a comparand register 904, a second read/write circuit 906, and match flag logic 908. For simplicity, table 420 and compare logic 430 are illustrated in FIG. 9 as a single DTP circuit 404. Thus, although not shown in FIG. 9, table 420 includes the V-bits described above with respect to FIG. 4.

CAM device 902, which is coupled between address decoder 408 and DTP circuit 404, can be any suitable CAM device including, for example, synchronous or asynchronous CAM devices having binary, ternary, or quaternary CAM cells. CAM device 902 includes a plurality of rows 910 of CAM cells for storing the flow ID's FID(0)-FID(n–1) for a corresponding plurality of packets. Each row 910 of CAM device 902 is coupled to a corresponding word line WL, and is coupled to a corresponding row 422 in table 420 via a corresponding match line ML. Thus, each flow ID stored in CAM device 902 is associated with a departure time stored in a corresponding row 422 of table 420 and with a payload stored in a corresponding location of packet buffer memory 102. In addition, the match lines ML are provided as input signals to match flag logic 908. Match flag logic 908 is well-known, and generates an active low match flag /MF in response to match conditions in CAM device 902 indicated on match lines ML.

As illustrated in FIG. 9, the word lines WL are coupled to outputs of corresponding MUXes 920, each of which includes a first input coupled to address decoder 408 by a corresponding address line AL, a second input coupled to a corresponding match line ML, and a control terminal to receive a select signal MUX_SEL2. Thus, MUXes 920(0)-920(n–1) allow CAM rows 910 to be selected by address lines AL (e.g., when MUX_SEL2 is de-asserted to logic 0) or by match lines ML (e.g., when MUX_SEL2 is asserted to logic 1). For other embodiments, other circuitry can be employed to select rows 910 of CAM device 902 for read and write operations in response to either address decoder 408 or match conditions indicated on match lines ML.

CAM device 902 includes an extra column of CAM cells 912 for storing a most-recent bit (M-bit) 912 for each row 910. Each M-bit 912 indicates whether the flow ID stored in the corresponding row 910 is associated with the most recently accepted packet for that flow. Upon reset or power-up, the M-bits are initially de-asserted to logic 0. When a flow ID entry is stored in a row 910 of CAM device 902, its corresponding M-bit is asserted to logic 1. When a next packet of the same flow is received, the M-bit corresponding to the next (e.g., most recently received) packet is asserted, and the M-bit corresponding to the previous packet of the same flow is de-asserted. Thus, for any given flow, only the flow ID entry corresponding to the most recently received packet of that flow has an asserted M-bit.

Figure 10:
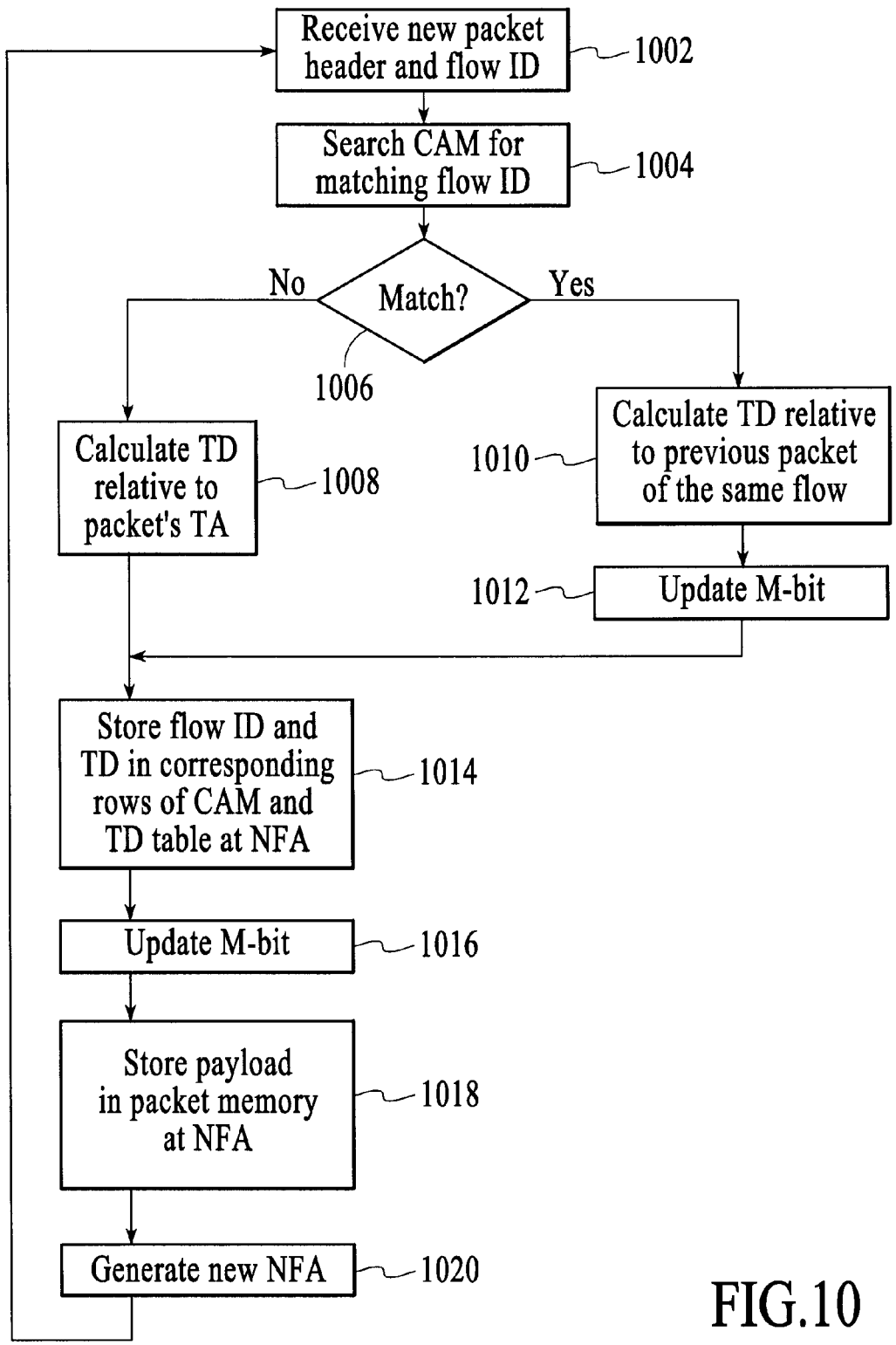
FIG. 10 is a flow chart illustrating an exemplary operation for shaping traffic flows in one embodiment of the traffic management processor of FIG. 9.

Operation of one embodiment of traffic management processor 900 is described below with respect to the flow chart of FIG. 10. When a packet is accepted, the corresponding packet parameters are provided to traffic management processor 900 as described above (1002). For one embodiment, the flow ID is provided to comparand register 904 and to read/write circuit 906, which may also receive an asserted M-bit, and the parameters SZ and 1/BW are provided to DTC circuit 302. Comparand register 904 provides the flow ID and an asserted M-bit as a search key to CAM device 902 to compare with entries in CAM device 902 (1004). The flow ID portion of the search key is compared with FID(0)-FID(n–1) stored in rows 910 of CAM device 902, and the asserted M-bit is compared with corresponding M-bits stored in column 912. Thus, in order to generate a match condition for CAM device 902, a flow ID entry in row 910 must match the flow ID portion of the search key and have an asserted M-bit 912.

If there is not a match, as tested in 1006, which indicates that the associated packet represents a new flow, DTC circuit 302 calculates the packet departure time relative to the packet's arrival time (1008). For example, in response to the mismatch condition in CAM device 902 indicated on ML, match flag logic 908 de-asserts /MF (e.g., to logic high). The de-asserted state of /MF causes DTC circuit 302 to calculate the departure time for the packet using the expression TD=TA+SZ/BW, as described above with respect to FIGS. 3 and 4.

If there is a match in CAM device 902, which indicates that the packet is part of an existing flow, DTC circuit 302 calculates the departure time for the packet relative to the departure time of the previously received packet of the same flow, thereby shaping the flow (1010). For example, in response to the match condition, CAM device 902 asserts the corresponding ML (e.g., to logic high). The asserted state of the match line ML selects the corresponding row 422 of table 420 that stores the departure time ($TD_{m-1}$) for the previous packet of the same flow. The read enable signal RE1 is asserted, and $TD_{m-1}$ is provided to DTC circuit 302 via read/write circuit 410. The asserted state of the match line ML also causes match flag logic 908 to assert /MF (e.g., to logic low), and in response thereto, DTC circuit 302 calculates the departure time ($TD_m$) for the new packet of the same flow using the expression $TD_m=TD_{m-1}+SZ/BW$.

The M-bit 912 in CAM device 902 corresponding to the previous packet of the flow is updated to indicate that the packet is no longer the most recently received packet for the flow (1012). For example, the asserted match line ML of CAM device 902 can be used to select the matching row for a write operation by driving the word line WL of the CAM row 910 in response to ML via MUX 920 (e.g., by asserting MUX_SEL2 to logic high). The write enable signal WE2 is asserted, and read/write circuit 906 de-asserts the M-bit, for example, by writing a logic 0 to the M-bit location 912 of the matching row. For some embodiments, a latch (not shown for simplicity) may be coupled to each match line ML to latch its logic state for subsequent addressing of CAM device 902.

Then, the flow ID and the departure time ($TD_m$) for the new packet are stored at corresponding locations in CAM device 902 and table 420, respectively, indicated by the NFA provided by NFA register 412 (1014), and the M-bit of the new entry in CAM device 902 is asserted (1016). For example, MUX_SEL2 is de-asserted (e.g., to logic low), and address decoder 408 selects a row 910 in CAM device 902 and a corresponding row 422 in table 420 indicated by the NFA. Read/write circuit 906 writes FID to the selected row 910 in CAM device 902, and asserts the corresponding M-bit 912 (e.g., to logic high) to indicate that the corresponding packet is the most recently received packet for the flow. DTC circuit 302 forwards $TD_m$ to read/write circuit 410, which in turn writes $TD_m$ to the selected row 422 in table 420 and asserts the corresponding V-bit 424.

For some embodiments, an additional address decoder (not shown for simplicity) can be provided to select rows 422 of table 420 in response to NFA. For other embodiments, the word lines WL for CAM device 902 can also be coupled to table 420 to select rows 422 in response to NFA or match lines ML. For still other embodiments, additional word lines (not shown for simplicity) can be coupled between address decoder 408 and table 420 to select rows 422 of table 420 in response to NFA.

The packet's payload is then stored at a location indicated by NFA in packet buffer memory 102 (1018), and priority encoder 406 generates a new NFA which, in turn, is stored in NFA register 412 (1020).

Traffic management processor 900 selects packets for departure in the manner described above with respect to FIGS. 4 and 7. For example, compare logic 430 compares the departure times provided from selected rows 422 of table 420 with each other to determine which row stores the earliest departure time, and priority logic 406 generates a token that is the index of that row. Thereafter, the token is used to access the payload from packet buffer memory 102, and the packet is transmitted from system 100.

For embodiments of FIG. 4, the V-bit 424 for a departure time in table 420 is de-asserted when the packet is selected for departure, which in turn allows priority encoder 406 to select the row 422 in table 420 for replacement with a new departure time for a new packet. However, for embodiments of FIG. 9, the departure time of a packet selected for transmission is needed to calculate the departure time of the next packet in the same flow, and therefore should be retained after the packet departs. Thus, the departure time for the most recently received packet for a flow should be retained unless the packet is the last packet in the flow. Accordingly, for some embodiments of FIG. 9, the last packet of a flow can include a termination bit that indicates the packet is the terminal packet in the flow. The termination bit can be used to override and de-assert the M-bit for the last packet in the flow, and then priority encoder 406 can generate the NFA in response to V-bits 424 and M-bits 912. For one embodiment, priority encoder 406 can be configured to consider corresponding rows 910 in CAM device 902 and rows 422 in table 420 only if the corresponding V-bit is de-asserted and the corresponding M-bit is de-asserted.

Shaping individual traffic flows by computing the departure time for a packet relative to the departure time for the previous packet in the same flow is useful in preventing downstream congestion. In addition, shaping traffic flows also prevents an inadvertent re-ordering of packets that may result if new departure times are not calculated relative to the departure times of previous packets in the same flow. For example, when scheduling packets using the WFQ expression TD=TA+SZ/BW without traffic shaping, it is possible for a new packet of a flow to be scheduled for departure earlier than the previous packet of the flow if the new packet is significantly smaller than the previous packet, thereby inadvertently changing the transmission order of the packets. For some traffic flows, an inadvertent re-ordering of packets may result in lost or corrupted data.

Further, by shaping individual traffic flows, as opposed to aggregating traffic flows of the same type and then collectively shaping all such flows, traffic management processor 900 can provide unique shaping parameters to different traffic flows. The ability to provide different shaping parameters to different traffic flows may result in more sophisticated levels of traffic flow differentiation, which in turn can provide a competitive advantage.

Figure 11:
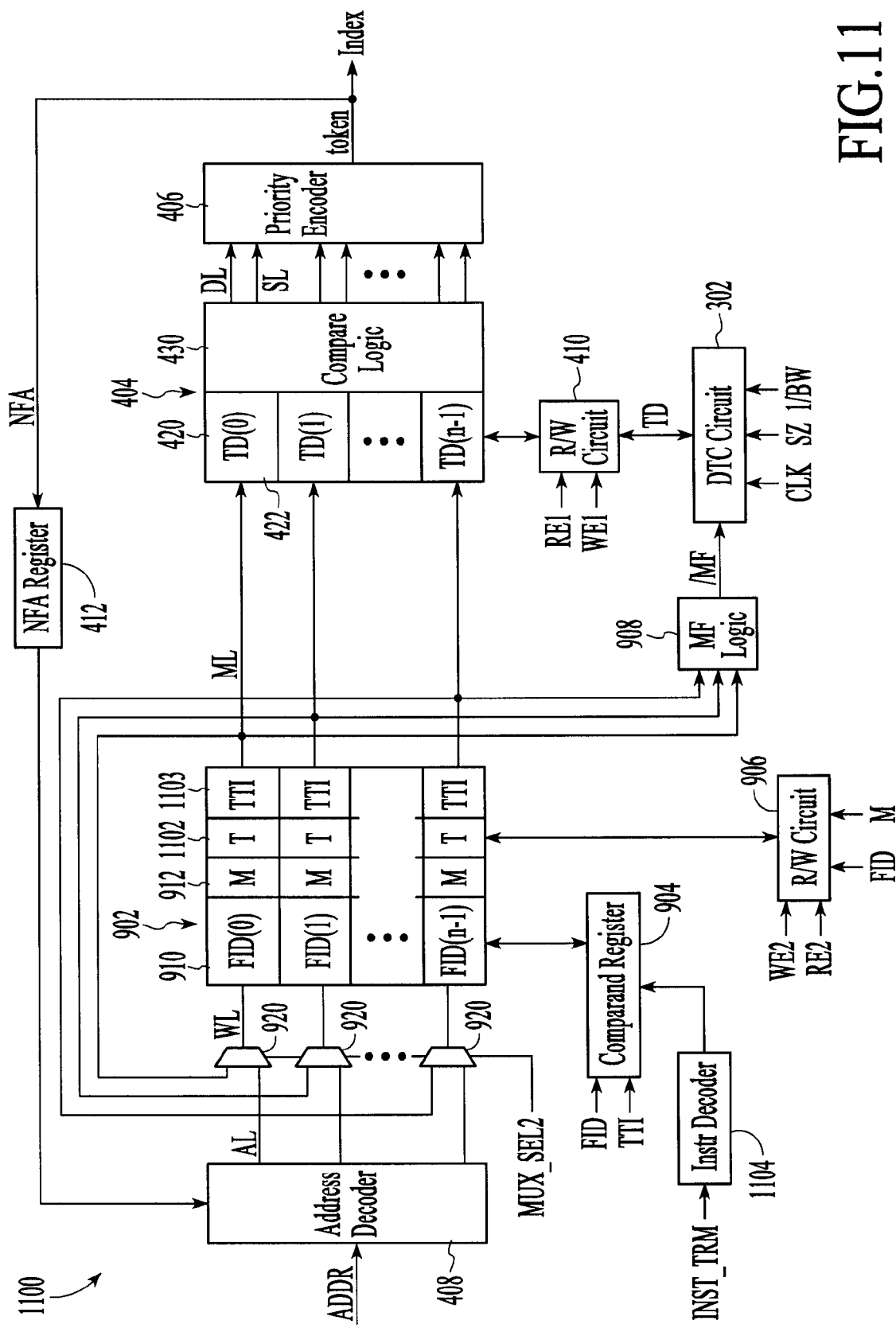
FIG. 11 is a block diagram of an embodiment of the traffic management processor of FIG. 3 configured to terminate selected traffic flows and/or selected types of traffic.

FIG. 11 shows a traffic management processor 1100 that is configured to selectively terminate traffic flows in response to a termination instruction. Traffic management processor 1100 includes all the elements of traffic management processor 900 of FIG. 9, with the addition of an instruction decoder 1104. Instruction decoder 1104 includes an input to receive a termination instruction INST_TRM and an output coupled to comparand register 904.

In addition, for some embodiments of FIG. 11, CAM device 902 can include extra columns of storage locations (e.g., CAM cells, SRAM cells, latches, and the like) 1102 and 1103 to store a plurality of termination (T) bits and a plurality of traffic type indicator (TTI) bits. Each termination bit 1102 indicates whether corresponding entries in CAM device 902 and table 420 are to be terminated. Each TTI bit 1103 indicates the traffic type of the packet having corresponding entries in CAM 902 and table 420. For other embodiments, the termination bits 1102 and/or TTI bits 1103 can be stored in another table or suitable storage device.

For some embodiments, each packet header includes a termination bit that indicates whether the packet is the last packet in the corresponding traffic flow. For example, in one embodiment, the termination bits in headers for all but the last packet in a flow are de-asserted, and the termination bit in the header of the last packet is asserted to indicate that the packet is the last packet in the flow. The termination bit 1102 from each packet can be stored in CAM device 902 when the packet's flow ID and M-bit 912 are stored therein.

The termination bits 1102 can be used to invalidate or delete corresponding entries in CAM device 902 and table 420 in response to a termination instruction INST_TRM. The termination instruction, which can be provided to traffic management processor 1100 by another device such as, for example, a downstream node, a network administrator, or other source, can instruct traffic management processor 1100 to delete a specific traffic flow or all traffic flows of a specified traffic type (e.g., all best effort flows). The termination instruction may be generated in response to certain network conditions such as, for example, network congestion.

Figure 12A:
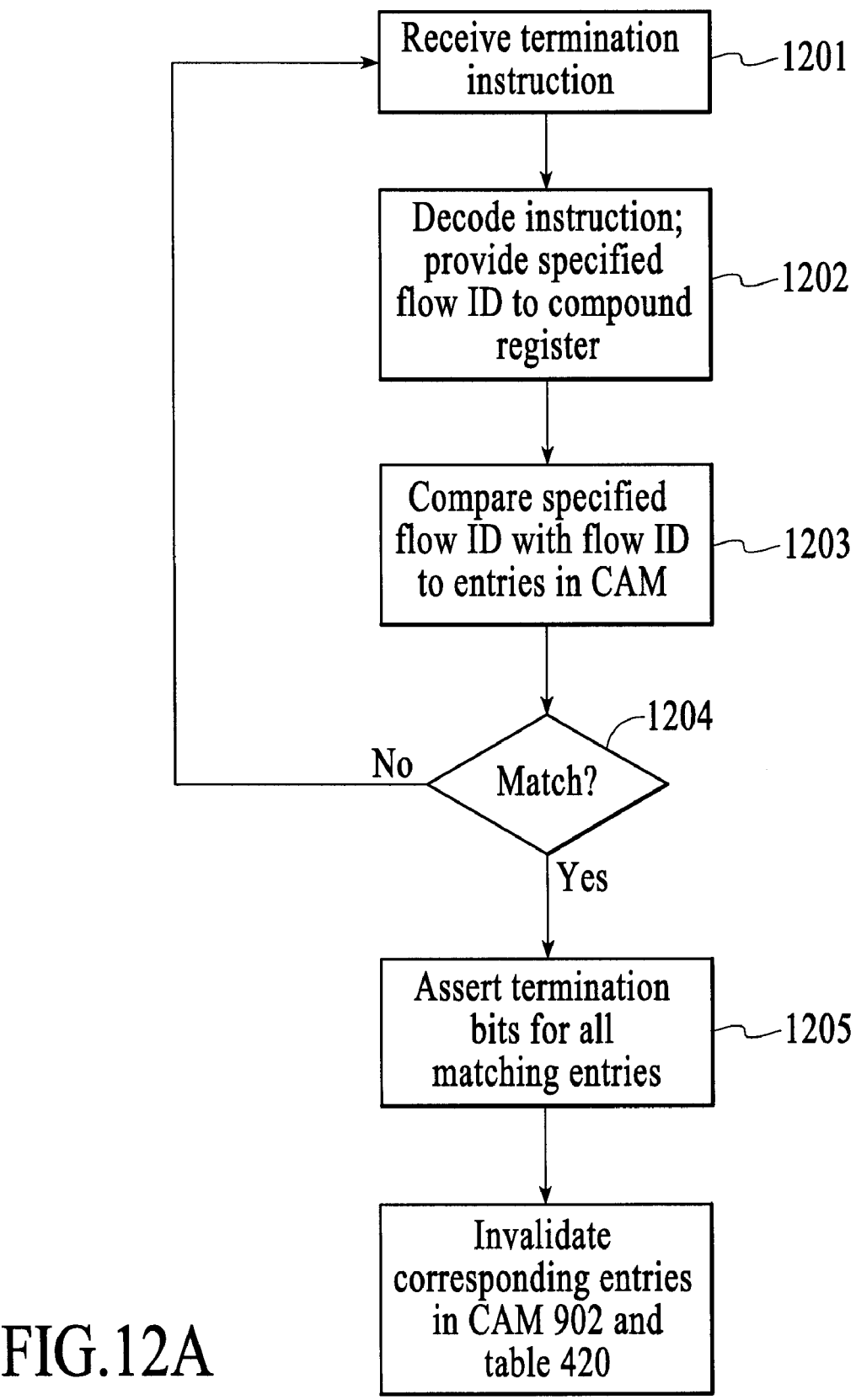
FIG. 12A is a flow chart illustrating an exemplary operation for terminating a specified traffic flow in one embodiment of the traffic management processor of FIG. 11.

An exemplary operation for terminating a specified traffic flow in traffic management processor 1100 is described below with respect to the illustrative flow chart of FIG. 12A. A termination instruction INST_TRM is received that identifies which traffic flow is to be deleted (1201). For example, the termination instruction may include a termination enable bit and/or a flow ID (FID) specifying which traffic flow is to be deleted. Instruction decoder 1104 decodes the instruction and provides control signals to comparand register 904, which in response thereto receives the specified flow ID (FID) as a search key (1202). Comparand register 904 provides the specified flow ID as a search key to CAM 902, which in turn compares the specified flow ID with flow ID entries stored therein (1203). If there is not a match, as tested at 1204, no entries in CAM device 902 and table 420 are invalidated, and processing continues at 1201.

Conversely, if there are one or more matches, the termination bits 1102 of the matching entries are asserted, e.g., to logic 0 (1205). For example, the match lines ML asserted in response to the compare operation in CAM device 902 can be used to select the matching rows 910 in CAM device 902 for a write operation during which read/write circuit 906 writes a logic 0 to the termination bit locations 1102 in the matching rows. Thereafter, the asserted termination bits 1102 can be used to invalidate corresponding entries in CAM device 902 and table 420 (1206).

For one embodiment, the termination bits 1102 can be provided to priority encoder 406, which in turn can use the termination bits 1102 to generate the NFA for new storing entries in CAM 902 and table 420, irrespective of the V-bits associated with table 420, thereby invalidating the corresponding entries in CAM device 902 and table 420. For another embodiment, the termination bits 1102 can be used to de-assert the V-bits in table 420 and de-assert the M-bits 912 in CAM device 902, which as described above with respect to FIG. 9 invalidates corresponding entries in CAM device 902 and table 420.

Figure 12B:
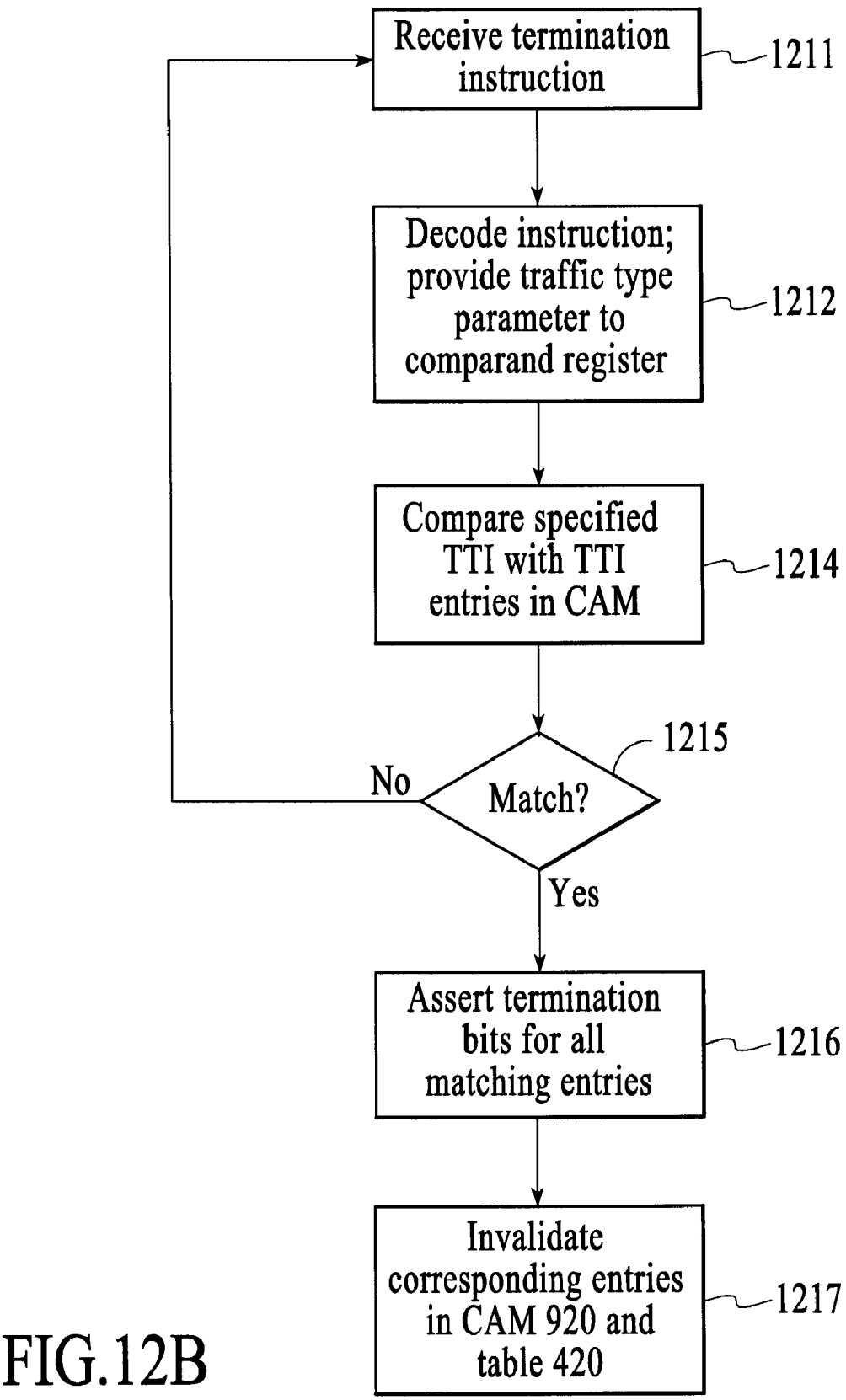
FIG. 12B is a flow chart illustrating an exemplary operation for terminating a specified type of traffic in one embodiment of the traffic management processor of FIG. 11.

An exemplary operation for terminating all traffic flows of a specified traffic type in traffic management processor 1100 is described below with respect to the illustrative flow chart of FIG. 12B. A termination instruction is received that identifies which types of traffic are to be deleted (1211). For example, the termination instruction may include a termination enable bit and/or a traffic type indicator (TTI) specifying which types of traffic are to be deleted. Instruction decoder 1104 decodes the instruction and provides control signals to comparand register 904, which in turn receives the specified traffic type as a search key (1212). Comparand register 904 provides the specified TTI as a search key to CAM device 902 for comparison with the TTI entries 1103 stored therein (1214). If there is not a match, as tested at 1215, no entries in CAM device 902 and table 420 are invalidated, and processing continues at 1211.

Conversely, if there are one or more matches, the termination bits 1102 of the matching entries are asserted (1216), and used to invalidate corresponding entries in CAM device 902 and table 420 (1217), as described above.

For other embodiments, FID and TTI can be provided to comparand register on the same signal line or bus.

Thus, traffic management processor 1100 can be configured to terminate individually specified traffic flows or all traffic flows of a specified traffic type. The ability to terminate individual traffic flows allows systems incorporating traffic management processor 1100 to assign different priorities to individual traffic flows. For example, some customers may be willing to pay a higher fee to classify one or more of their traffic flows as higher-priority traffic flow, and traffic management processor 1100 can terminate individual traffic flows according to priority. Further, because traffic management processor 1100 can also detect and terminate specified traffic types, traffic management processor 1100 can terminate non-critical traffic during congestion conditions while allowing more critical traffic to be transmitted.

Figure 13:
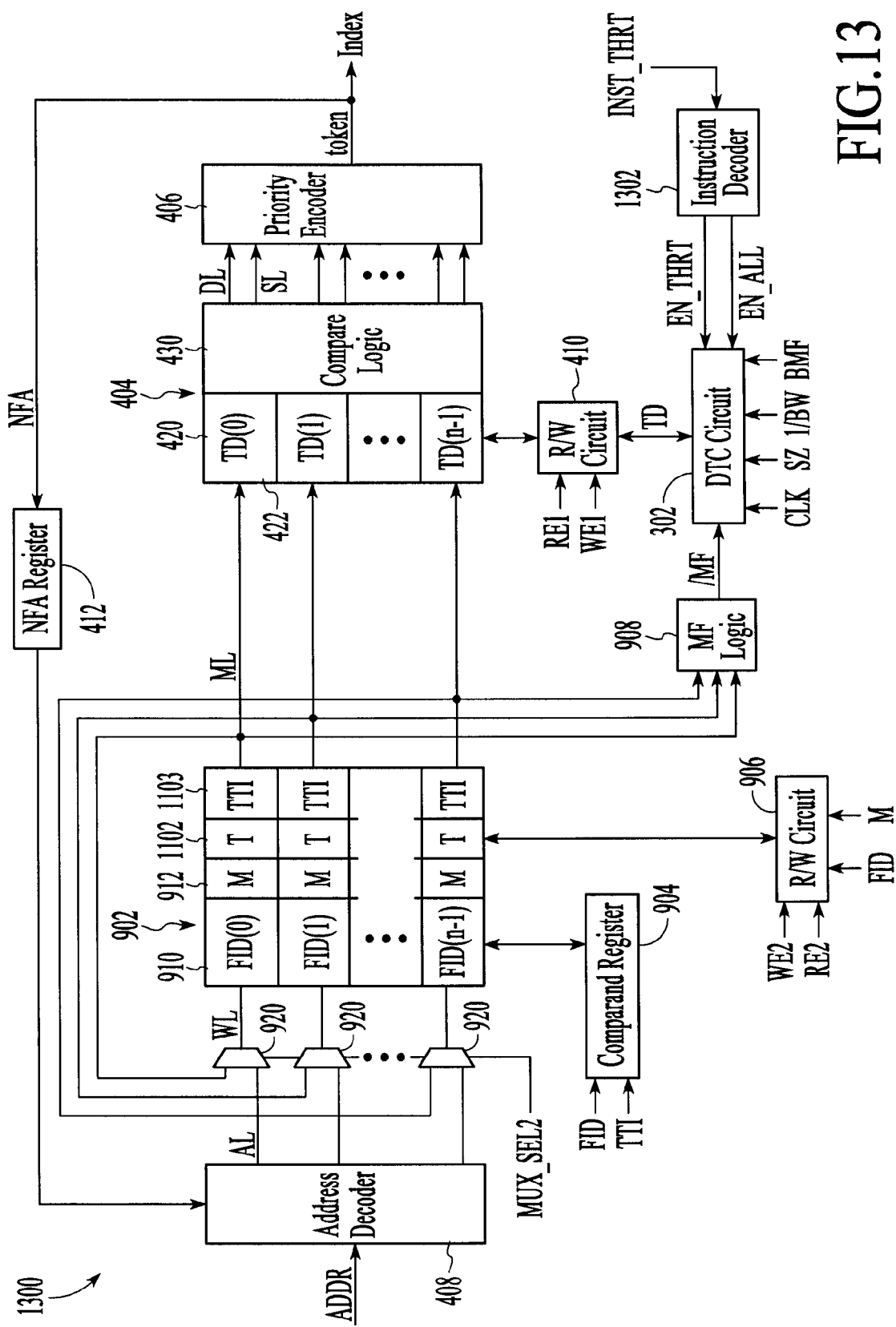
FIG. 13 is a block diagram of an embodiment of the traffic management processor of FIG. 3 configured to throttle selected traffic flows and/or selected types of traffic.

FIG. 13 shows a traffic management processor 1300 that is configured to selectively throttle traffic flows in response to a throttle instruction, for example, to alleviate downstream congestion. Traffic management processor 1300 includes all the elements of traffic management processor 900 of FIG. 9, with the addition of an instruction decoder 1302. Instruction decoder 1302 includes an input to receive a throttle instruction (INST_THRT), and outputs to provide a throttle enable signal (EN_THRT) and an enable all signal (EN_ALL) to DTC circuit 302. For some embodiments, the throttle instruction INST_THRT can include one or mode bits (MODE) that indicate whether to throttle all packets, to throttle no packets, to throttle packets of a specified traffic flow, or to throttle packets of a specified traffic type.

For the embodiment of FIG. 13, DTC circuit 302 is modified (e.g., from earlier embodiments) to include inputs to receive EN_THRT and EN_ALL from instruction decoder 1302 and to include an input to receive a bandwidth multiplier factor (BMF) for incoming packets. In addition, DTC circuit 302 of FIG. 13 is configured to selectively adjust (e.g., multiply) the 1/BW parameter by BMF in response to EN_THRT, EN_ALL, and/or /MF when calculating departure times for packets. Adjusting the 1/BW parameter for departure time calculations alleviates downstream congestion by delaying the departure times for selected packets, flows, or traffic types. For some embodiments, each packet header includes a BMF that is provided as an input to DTC circuit 302 upon receipt of the packet into system 100. For other embodiments, an associated memory device (not shown for simplicity) can store a BMF for each traffic flow and/or a BMF for each type of traffic.

Figure 14:
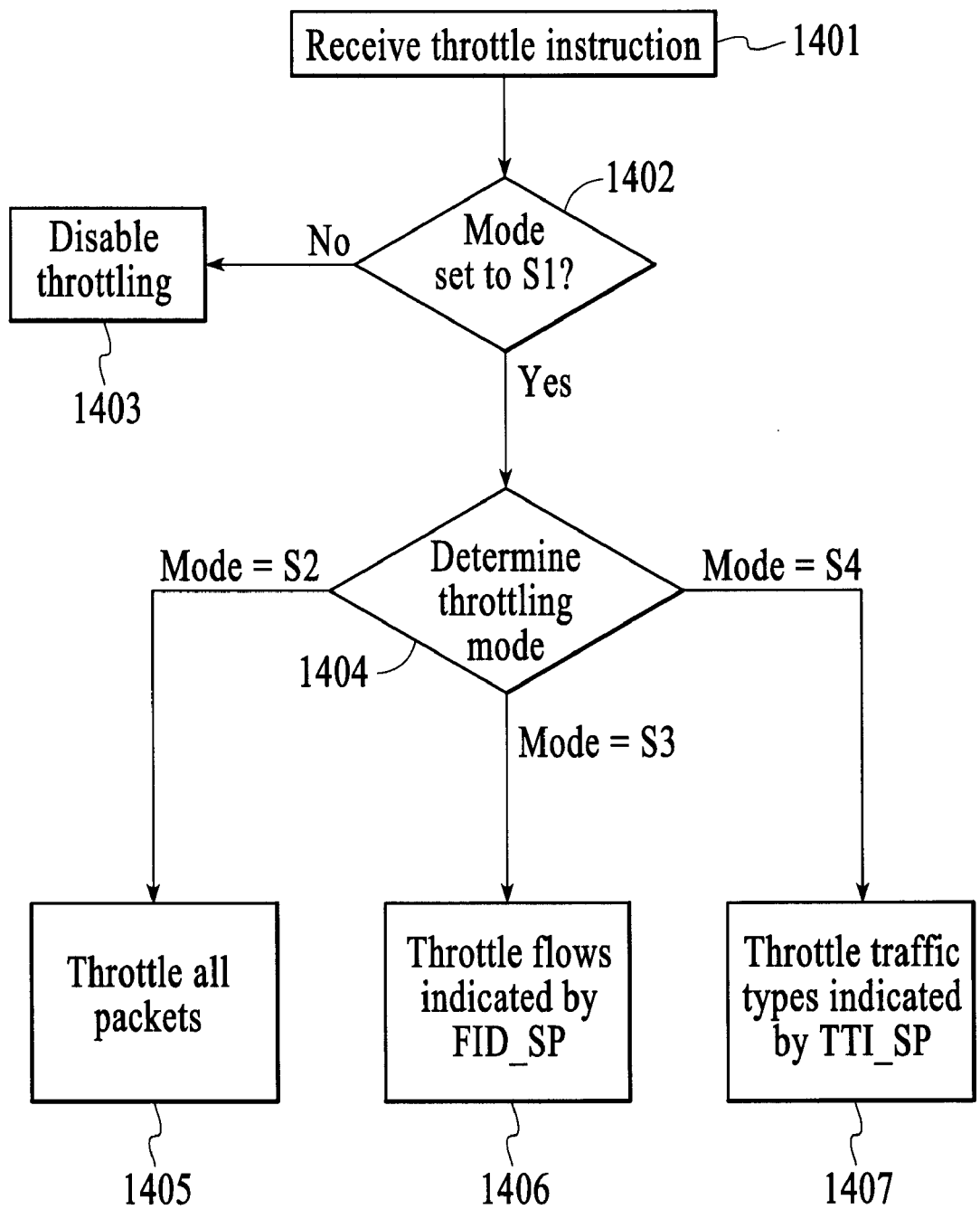
FIG. 14 is a flow chart illustrating an exemplary operation for throttling selected traffic in one embodiment of the traffic management processor of FIG. 13.

An exemplary operation for selectively throttling the transmission rate of individual traffic flows in system 100 is described below with respect to the illustrative flow chart of FIG. 14. A throttle control instruction INST_THRT is provided to and decoded by instruction decoder 1302 (1401). If MODE is set to a first state (e.g., MODE=S1), as tested at 1402, instruction decoder 1302 disables the throttling feature, and DTC circuit 302 calculates the departure time for the packet using the provided 1/BW parameter (1403). For example, in response to MODE=S1, instruction decoder 1302 de-asserts EN_THRT and de-asserts EN_ALL, which in turn causes DTC circuit 302 to calculate the departure time for the packet without adjusting 1/BW by BMF.

Conversely, if MODE is not set to the first state (e.g., MODE≠S1), as tested at 1402, MODE is further examined at 1404. If MODE is set to a second state that indicates that all traffic is to be throttled (e.g., MODE=S2), instruction decoder 1302 asserts EN_ALL, which causes DTC circuit 302 to adjust 1/BW by BMF for departure time calculations for all packets, regardless of its traffic flow or traffic type (1405).

If MODE is set to a third state that indicates that only specified traffic flows are to be throttled (e.g., MODE=S3), then only packets belonging to the specified traffic flows are throttled (1406). For example, instruction decoder 1302 asserts EN_THRT and de-asserts EN_ALL, and a specified flow ID is provided as a search key to comparand register 904, which in turn provides the specified flow ID to CAM device 902 for comparison with the flow ID entries stored in CAM device 902. If there is a match, match flag logic 908 asserts /MF. In response to the asserted /MF and the asserted EN_THRT, DTC circuit 302 adjusts 1/BW by BMF when calculating the packet's departure time. If there is not a match, match flag logic 908 de-asserts /MF. In response to the de-asserted /MF and asserted EN_THRT, DTC circuit 302 calculates the departure time for the packet without adjusting 1/BW by BMF.

If MODE is set to a fourth state that indicates that only specified traffic types are to be throttled (e.g., MODE=S4), then only packets belonging to flows of the specified traffic type are throttled (1407). For example, instruction decoder 1302 asserts EN_THRT and de-asserts EN_ALL, and a specified TTI is provided to comparand register 904 as a search key, which in turn provides the specified TTI to CAM device 902 for comparison with the TTI entries 1103 stored in CAM device 902. If there is match, match flag logic 908 asserts /MF. In response to the asserted /MF and the asserted EN_THRT, DTC circuit 302 adjusts 1/BW by BMF when calculating the packet's departure time. If there is not a match, match flag logic 908 de-asserts /MF. In response to the de-asserted /MF and the asserted EN_THRT, DTC circuit 302 calculates the departure time for the packet without adjusting 1/BW by BMF.

For alternate embodiments, an additional look-up table (e.g., CAM device) for comparing the specified flow ID's and specified traffic type indicators with the flow ID and the TTI entries for incoming packets can be coupled to instruction decoder 1302.

For some embodiments, the BMF can be one or more bits that represent a factor by which 1/BW is multiplied for departure time calculations. For example, two BMF bits can be used to multiply the 1/BW parameter by a factor of 1, 2, 3, or 4, although any number of BMF bits can be used to provide any number of bandwidth multiplier factors to DTC circuit 302. For other embodiments, one or more BMF bits can be used to address one of a plurality of bandwidth multiplier factors stored in an associated storage device (e.g., a table).

Figure 15:
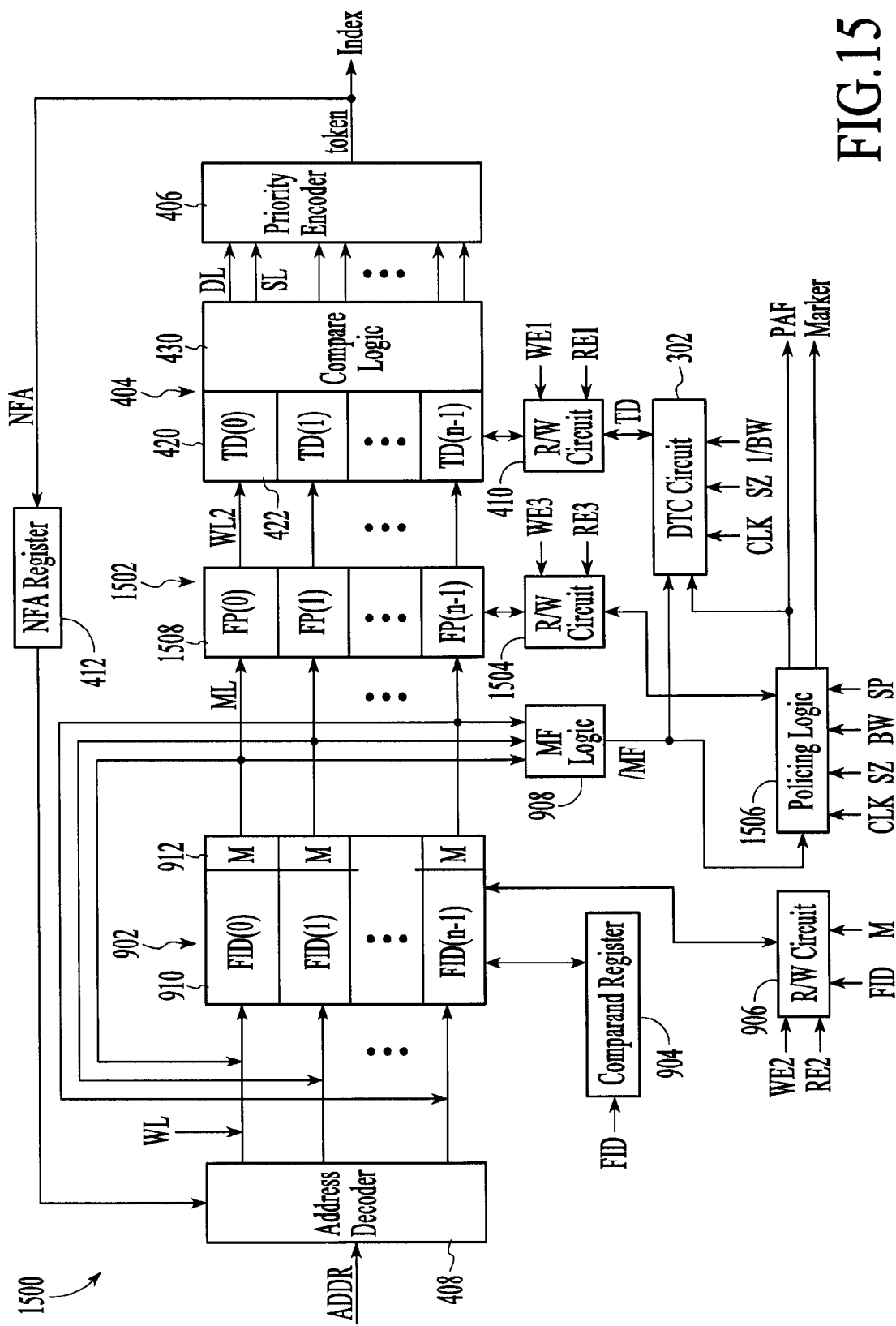
FIG. 15 is a block diagram of an embodiment of the traffic management processor of FIG. 3 configured to police individual traffic flows.

FIG. 15 shows a traffic management processor 1500 that is configured to selectively police individual traffic flows for compliance with the bandwidth parameters specified in a corresponding service level agreement (SLA). For example, traffic entering system 100 is monitored to ensure that it complies with the relevant bandwidth allocations and is thus "in profile." Traffic that exceeds the allocated bandwidth is considered "out of profile," and may be shaped or even dropped. Alternatively, system 100 may mark traffic exceeding the traffic specification as out of profile, but allow it to proceed through the network anyway. Thereafter, if there is congestion, a downstream network device may drop such marked traffic to alleviate congestion conditions.

Traffic management processor 1500 includes all of the elements of traffic management processor 900 of FIG. 9, with the addition of a parameter table 1502 inserted between CAM device 902 and DTP circuit 404. Traffic management processor 1500 also includes a read/write circuit 1504 and policing logic 1506. Parameter table 1502 may be any suitable buffer or memory element and includes n rows 1508 to store flow parameters FP for up to n corresponding packets. Each row 1508 of parameter table 1502 is coupled to a corresponding row 910 of CAM 902 via a match line ML, and is coupled to a corresponding row 422 of table 420 of DTP 404 via a word line WL2. For one embodiment, each ML and its corresponding word line WL2 are the same line. Thus, the parameters stored in each row 1508 of parameter table 1502 are associated with a flow ID stored in a corresponding row of CAM 902, a departure time stored in a corresponding row 422 of table 420, and a payload stored in a corresponding location of packet buffer memory 102.

For one embodiment, each row 1508 of parameter table 1502 is segmented into four fields to store TA, 1/BW, a sliding window sample period (SP), and the currently available bandwidth (ABW) for an associated packet. Each row 1508 may be any suitable length, and may be segmented into any suitable number of fields to store various numbers of parameters.

Policing logic 1506 polices incoming traffic using a well-known leaky bucket technique to determine whether to accept or reject incoming packets. Policing logic 1506 receives CLK, SZ, BW, and SP as input signals. As described below, the parameter SP represents the duration of a sliding window used for policing incoming traffic. The parameter SP may be provided by a host system such as, for example, a network administrator. Alternately, SP may be provided by network processing unit 102 or packet classification processor 106. For one embodiment, SP is 10 micro-seconds, although in other embodiments SP may be any suitable duration. In addition, policing logic 1506 includes an output to provide an out of profile marker for packets that are out of profile but have not been dropped.

Figure 16:
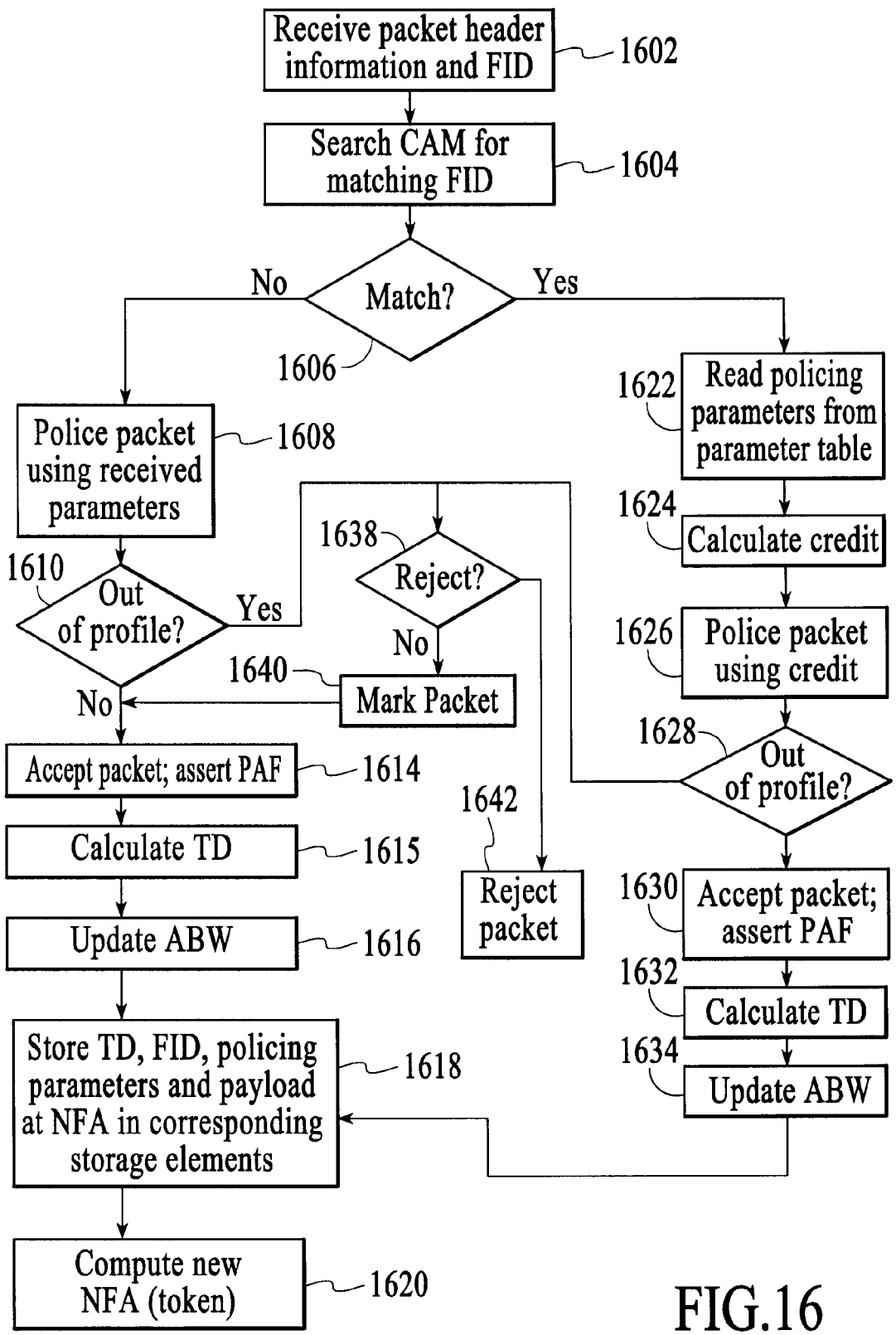
FIG. 16 is a flow chart illustrating an exemplary operation for policing traffic in one embodiment of the traffic management processor of FIG. 15.

Operation of one embodiment of policing logic 1506 for traffic management processor 1500 is described below with respect to the flow chart of FIG. 16. When a packet is received, the corresponding packet parameters are provided to traffic management processor 1500 in the manner described above (1602). The flow ID for the new packet is compared with flow ID entries and their corresponding M-bits in CAM 902, as described above (1604). If there is not a match, as tested at 1606, the packet represents a new flow, and the match flag /MF is de-asserted. Policing logic 1506 uses SZ, BW, and SP to determine whether to accept or reject the packet (1608).

For example, policing logic 1506 determines whether the bandwidth available for the flow during the sliding window is greater than or equal to the packet size. The maximum amount of data that may be accepted during a sliding window period (which is analogous to the size of a leaky bucket) may be expressed as B=BW*SP. The currently available bandwidth is equal to the maximum amount allowed minus the size of any packets previously received during the sliding window period, i.e., ABW=B−SZ. Because this is the first packet of the flow, the leaky bucket for the flow is "empty", and thus the currently available bandwidth is equal to the leaky bucket size, i.e., ABW=B. Accordingly, the currently available bandwidth ABW is compared with the packet size SZ to determine whether the packet is out of profile.

Thus, if ABW<SZ, as tested at step 1610, which indicates that there is not enough bandwidth or room available in the leaky bucket for the packet, e.g., the packet is out of profile, processing continues to 1638. If a reject mode bit is asserted, as tested at 1638, the packet is rejected and the packet accept flag is de-asserted (1642). Otherwise, if the reject mode bit is not asserted, the packet is marked as out of profile (1640), and thereafter the packet is accepted and the packet accept flag PAF is asserted (1614).

Conversely, if ABW≧SZ, the packet is accepted, and PAF is asserted to logic high (1614). The asserted state of PAF instructs DTC circuit 302 to calculate the departure time for the packet (1615). For some embodiments, DTC circuit 302 calculates the departure time using the WFQ expression TD=TA+SZ/BW in response to the de-asserted match flag /MF. Policing logic 1506 then updates the currently available bandwidth to reflect acceptance of the packet (1616). For example, because the packet has been accepted, the currently available bandwidth for the sliding window period decreases by size of the packet, i.e., $ABW_{new}=ABW_{old}-Z$.

Policing logic 1506 then forwards the TA, SP, BW, and the updated ABW to read/write circuit 1504 which, in response to an asserted write enable signal WE3, writes the parameters into parameter table 1502 at the NFA. The flow ID for the packet is written to the row 610 of CAM 902 indicated by NFA, and the TD for the packet is written to row 422 of table 420 indicated by NFA (1618). The arrival time TA may be calculated in policing logic 1508, or alternately provided by DTC circuit 302. For one embodiment, an additional address decoder (not shown for simplicity) can be coupled to match lines ML to select a corresponding row 1508 of parameter table 1502 in response to NFA. For another embodiment, additional word lines (not shown for simplicity) may be coupled between address decoder 408 and parameter table 1502 so that address decoder 408 may select rows 1508 of parameter table 1502 in response to NFA. Also, the packet's payload is stored at the NFA of packet buffer memory 102. Priority encoder 406 then generates a new NFA (1620).

If the received FID matches an entry in CAM 902, as tested at 1606, the packet is part of an existing flow. The corresponding match line ML for CAM 902 is asserted and used to select a corresponding row 1508 in parameter table 1502. The parameters TA, SP, BW, and ABW for the flow are read from the selected row 1508 of parameter table 1502 and provided to policing logic 1506 via read/write circuit 1504, which may receive an asserted read enable signal RE3 (1622). The asserted match line ML is also used to select the matching row 910 in CAM 902 for a write operation to de-assert the corresponding M-bit. The asserted match line ML also causes match flag logic 908 to assert /MF, which in some embodiments may be provided to read/write circuit 1504 as a read enable signal.

In response to the asserted /MF, policing logic 1506 uses parameters read from the selected row 1508 of parameter table 1502 to calculate the credit for the flow (1624). As generally known in the art, the credit is the amount of unused bandwidth for a flow that is earned back due to the passage of time. In other words, the credit is the amount of data for the flow that has been removed (i.e., read) from the leaky bucket between the arrival times of the current and previous packets, and may be expressed as $C=(TA_m-TA_{m-1})*BW$, where $TA_m$ is the arrival time of the current packet and $TA_{m-1}$ is the arrival time of the previous packet. $TA_{m-1}$ is provided from the selected row 1508 of parameter table 1502.

Policing logic 1506 applies the credit to the previous available bandwidth, and then polices the packet accordingly (1626). Thus, $ABW_{new}=ABW_{old}+C$, where $ABW_{old}$ is the ABW read from the selected row 1508 of parameter table 1502. The newly credited ABW is then compared with the packet size to determine whether the packet is out of profile (1628).

If ABW<SZ, which indicates an out of profile condition, processing proceeds to 1638. Thus, as described above, if the reject mode bit is asserted, the packet is rejected, and PAF is de-asserted (1642). Otherwise, if the reject mode bit is not asserted, the packet is marked as out of profile (1640), and thereafter the packet is accepted and PAF is asserted (1614).

Conversely, if ABW>SZ, the packet is accepted, and PAF is asserted (1630). The asserted state of PAF instructs DTC circuit 302 to calculate TD for the packet (1632). In response to the asserted /MF, DTC circuit 302 calculates TD for the new packet using the shaping technique expressed by $TD=TD_{m-1}+SZ/BW$, as described above. Policing logic 1506 then updates ABW to reflect acceptance of the packet (1634), as described above with respect to step 1616. Using the NFA as a write address, the flow ID, the flow parameters, the departure time, and the payload are stored in corresponding rows of CAM 902, parameter table 1502, departure time table 420, and packet buffer memory 102, respectively (1618). Priority encoder 406 then generates a new NFA (1620).

Figure 17:
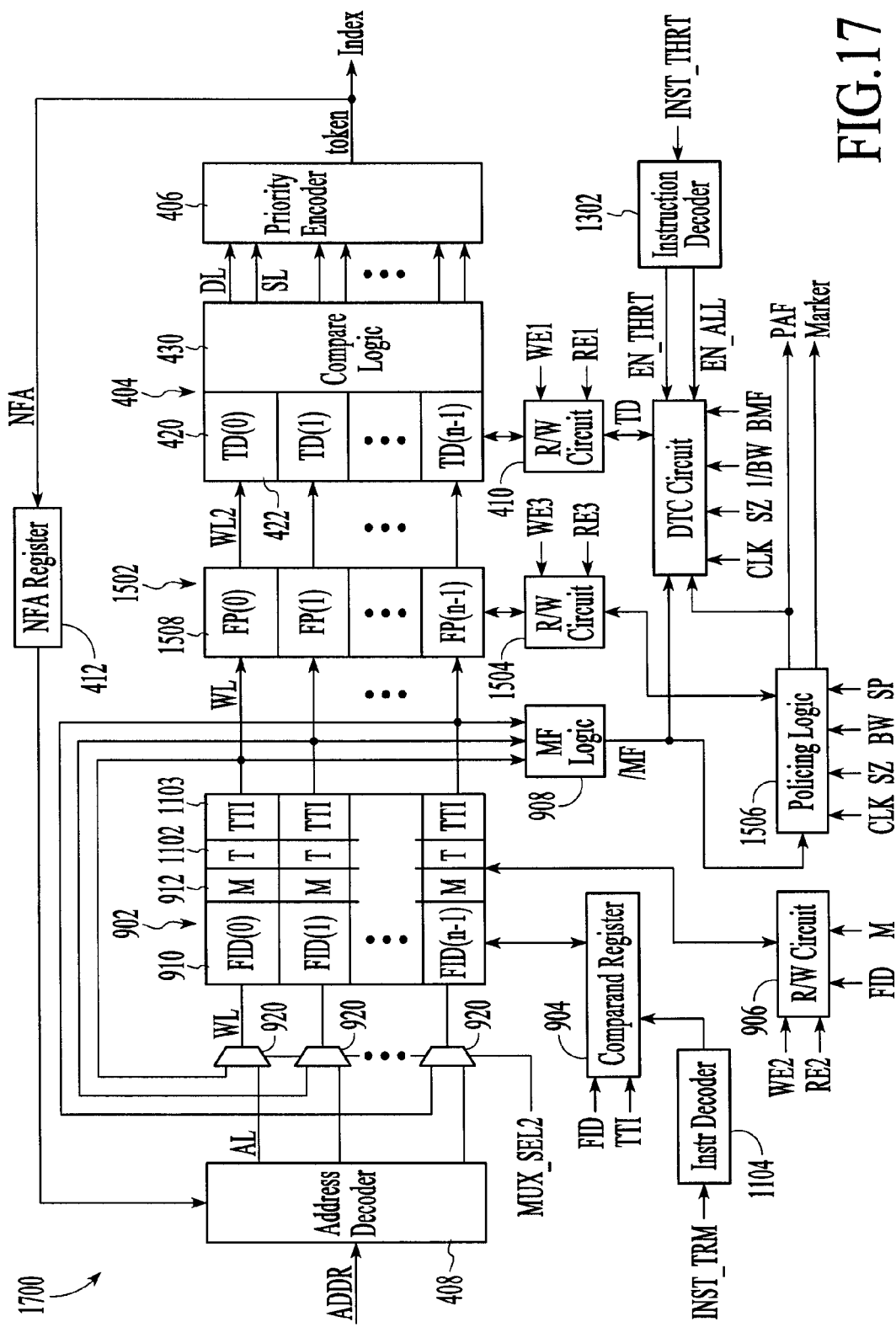
FIG. 17 is a block diagram of an embodiment of the traffic management processor of FIG. 3 configured to implement any number of the traffic management techniques of the present invention.

Although the queuing, shaping, per-flow traffic management, termination, congestion control, and policing features of the present invention are described for several embodiments, other embodiments of the present invention can include any combination of these features. For example, FIG. 17 shows a traffic management processor 1700 that incorporates all the elements of traffic management processor 400 of FIG. 4, traffic management processor 700 of FIG. 7, traffic management processor 900 of FIG. 9, traffic management processor 1100 of FIG. 11, traffic management processor 1300 of FIG. 13, and traffic management processor 1500 of FIG. 15.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A traffic management processor for independently throttling the bandwidth of individual traffic flows to alleviate network congestion, comprising:
   an instruction decoder having an input to receive a throttle control instruction identifying a flow identification (ID) of a particular traffic flow to be throttled in response to network congestion, and having an output to provide a throttle enable signal;
   a departure time calculator (DTC) circuit coupled to the instruction decoder and having an input to receive the throttle enable signal and configured to calculate a departure time for the incoming packet in response to size and bandwidth parameters associated with the incoming packet, wherein the DTC circuit is configured to selectively adjust the bandwidth parameter by a bandwidth multiplier factor (BMF) in response to the throttle enable signal to selectively delay the departure time of the incoming packet;
   a content addressable memory (CAM) device having a plurality of rows, each for storing the flow ID for a corresponding packet and a traffic type indicator (TTI) for the corresponding packet.

2. The traffic management processor of claim 1, wherein the throttle control instruction further comprises a specified traffic type indicator that indicates which type of traffic is to be throttled by selectively adjusting the packet departure times according to the BMF.

3. The traffic management processor of claim 2, wherein the throttle control instruction further comprises a mode signal that can be set to a state that causes the DTC circuit to alter the departure times of all packets to delay their transmission, regardless of the packet's flow ID or traffic type.

4. The traffic management processor of claim 1, further comprising:
   a departure time table coupled to the DTC circuit and having a plurality of rows, each for storing the departure time of a corresponding packet.

5. The traffic management processor of claim 1, wherein each packet includes the BMF and the flow ID.

6. A method for selectively throttling individual traffic flows, comprising:
   receiving an incoming packet including a bandwidth multiplier factor (BMF) and a flow identification (ID), the flow ID indicating to which traffic flow the incoming packet belongs and the BMF indicating an amount by which packet transmission times are selectively altered to delay transmission of the packets;

receiving a throttle control instruction specifying which traffic flow is subject to throttling in response to network congestion, wherein the throttling is unrelated to an ingress policing of a service;

determining whether the incoming packet is part of the traffic flow specified by the throttle control instruction; and selectively delaying transmission of the incoming packet in response to the determining, wherein the selectively delaying comprises:

receiving packet size and bandwidth parameters for the incoming packet; and selectively multiplying the bandwidth parameter by the BMF in response to the determining to calculate a delayed transmission time for the incoming packet.

7. The method of claim 6, wherein the determining comprises:

comparing a specified flow ID provided by the throttle control instruction with the flow ID from the incoming packet.

8. The method of claim 6, wherein the throttle control instruction further specifies which types of traffic are subject to throttling.

9. The method of claim 8, further comprising:

ascertaining whether the incoming packet is of the traffic type specified in the throttle control instruction.

10. The method of claim 9, wherein the ascertaining comprises:

comparing a traffic type indicator specified by the throttle control instruction with a traffic type indicator corresponding to the incoming packet.

11. A method for selectively throttling any number of traffic flows in response to network congestion, comprising:

receiving an incoming packet including a flow identification (ID), the flow ID indicating to which traffic flow the incoming packet belongs;

receiving a throttle control instruction including a specified flow ID indicating which traffic flow is subject to throttling;

comparing the specified flow ID with the incoming packet's flow ID to generate a throttle enable signal; and selectively delaying transmission of the incoming packet in response to the throttle enable signal, wherein the selectively delaying comprises calculating a departure time for the incoming packet in response to size and bandwidth parameters corresponding to the incoming packet and in response to a bandwidth multiplier factor (BMF), wherein the BMF selectively delays the packet departure time independently of an ingress policing service.

12. The method of claim 11, wherein the throttle control instruction further specifies which types of traffic are subject to throttling.

13. The method of claim 12, further comprising:

determining whether the incoming packet is of the traffic type specified by the throttle control instruction; and selectively asserting the throttle enable signal in response to the determining.

14. A traffic management processor for selectively delaying transmission of individual traffic flows to alleviate network congestion, wherein each traffic flow includes a collection of related packets, the comprising:

an instruction decoder having an input to receive a throttle control instruction identifying one or more individual traffic flows to be delayed in response to network congestion, and having an output to provide a throttle enable signal;

a content addressable memory (CAM) device having a plurality of rows, each row for storing a flow identification (ID) for a corresponding packet and each row including a match line, wherein the flow ID indicates which traffic flow the corresponding packet belong to; and a departure time calculator (DTC) circuit coupled to the instruction decoder, wherein the DTC circuit is configured to selectively adjust packet departure times by a bandwidth multiplier factor (BMF) to delay packet transmission in response to the throttle control instruction.

15. The traffic management processor of claim 14, further comprising:

match flag logic having inputs coupled to the rows of the CAM device and having an output to generate a match flag, wherein DTC circuit selectively adjusts the packet departure times in response to the match flag.

16. The traffic management processor of claim 15, wherein the match flag is generated in response to a comparison between a search key and the flow ID's stored in the CAM device.

17. The traffic management processor of claim 14, wherein instruction decoder is further configured to generate an enable all signal that causes the DTC circuit to alter the departure times of all packets, irrespective of which traffic flow or which traffic class the packets belong to.

18. The traffic management processor of claim 14, wherein the throttle control instruction further comprises a specified traffic type indicator (TTI) that indicates which type of traffic is to be throttled, and each row of the CAM device includes a TTI bit for the corresponding packet.

19. The traffic management processor of claim 14, wherein the throttle control instruction further comprises a mode signal that can be set to a state that causes the DTC circuit to alter the packet's departure time, regardless of the packet's flow ID or traffic type.

20. The traffic management processor of claim 14, further comprising:

a departure time table coupled to the DTC circuit and having a plurality of rows, each row for storing the departure time of a corresponding packet and each row coupled to a corresponding row of the CAM device.

* * * * *

UNITED STATES PATENT AND TRADEMARK OFFICE
CERTIFICATE OF CORRECTION

| | | |
|---|---|---|
| PATENT NO. | : 7,346,000 B1 | Page 1 of 1 |
| APPLICATION NO. | : 10/613628 | |
| DATED | : March 18, 2008 | |
| INVENTOR(S) | : Srinivasan et al. | |

It is certified that error appears in the above-identified patent and that said Letters Patent is hereby corrected as shown below:

In the Claims:

Claim 14, column 24, line 19, change "packet belong to" to --packet belongs to--.

Signed and Sealed this

Twenty-eighth Day of October, 2008

JON W. DUDAS
*Director of the United States Patent and Trademark Office*